US012605914B2

(12) United States Patent
Sato et al.

(10) Patent No.: US 12,605,914 B2
(45) Date of Patent: Apr. 21, 2026

(54) SUBSTRATE PROCESSING APPARATUS

(71) Applicant: TDK CORPORATION, Tokyo (JP)

(72) Inventors: Yohei Sato, Tokyo (JP); Hiroshi Koizumi, Tokyo (JP); Toshinobu Miyagoshi, Tokyo (JP); Osamu Shindo, Tokyo (JP); Seijiro Sunaga, Tokyo (JP); Mitsuyoshi Makida, Tokyo (JP); Makoto Yamashita, Tokyo (JP); Yasuo Kato, Tokyo (JP); Ryo Shindo, Tokyo (JP); Masashi Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 393 days.

(21) Appl. No.: 18/323,745

(22) Filed: May 25, 2023

(65) Prior Publication Data

US 2023/0382070 A1 Nov. 30, 2023

(30) Foreign Application Priority Data

May 26, 2022 (JP) ................................ 2022-086034

(51) Int. Cl.

*B25B 11/00* (2006.01)
*B30B 12/00* (2006.01)
*B30B 15/04* (2006.01)
*B30B 15/06* (2006.01)

(52) U.S. Cl.

CPC .............. *B30B 12/00* (2013.01); *B25B 11/00* (2013.01); *B30B 15/04* (2013.01); *B30B 15/062* (2013.01)

(58) Field of Classification Search

CPC ... B25B 1/00; B25B 1/24; B25B 11/00; B23P 19/00; B30B 12/00

See application file for complete search history.

(56) References Cited

U.S. PATENT DOCUMENTS

| | | | | |
|---|---|---|---|---|
| 7,290,760 | B1 * | 11/2007 | Lindsay | B25B 1/22 269/75 |
| 7,451,968 | B2 * | 11/2008 | Geldert | B60R 9/08 269/261 |
| 8,240,649 | B2 * | 8/2012 | Kim | H01L 21/67069 269/21 |
| 8,844,122 | B2 * | 9/2014 | Lin | H01R 43/20 29/747 |
| 11,898,360 | B2 * | 2/2024 | Petty | E04G 21/1841 |

(Continued)

FOREIGN PATENT DOCUMENTS

| | | | |
|---|---|---|---|
| JP | 3421512 | B2 | 6/2003 |
| JP | 2010-232234 | A | 10/2010 |

(Continued)

OTHER PUBLICATIONS

Translation of Mar. 4, 2026 Office Action issued in Japanese Application No. 2022-086034.

*Primary Examiner* — Lee D Wilson
(74) *Attorney, Agent, or Firm* — OLIFF PLC

(57) ABSTRACT

A substrate processing apparatus 10 applies pressure to a substrate 2 which is an object to be pressurized arranged on an upper jig plate 44. The substrate processing apparatus 10 includes a lower jig plate 46 arranged below the upper jig plate 44, an installation base 47 provided on the lower jig plate 46 and the substrate 2 is arranged; and the installation base is temporarily fixed to the installation base 47 in a deformable manner.

22 Claims, 14 Drawing Sheets

(56) References Cited

U.S. PATENT DOCUMENTS

| | | | | |
|---|---|---|---|---|
| 2016/0043053 | A1 | 2/2016 | Seyama | |
| 2023/0382070 | A1* | 11/2023 | Sato | B30B 15/04 |

FOREIGN PATENT DOCUMENTS

| | | | |
|---|---|---|---|
| JP | 2013-054343 | A | 3/2013 |
| JP | 2021-141158 | A | 9/2021 |
| KR | 10-2013-0009549 | A | 1/2013 |
| KR | 10-1603536 | B1 | 3/2016 |
| KR | 10-2016-0039193 | A | 4/2016 |

* cited by examiner

SUBSTRATE PROCESSING APPARATUS

BACKGROUND OF THE INVENTION

The present disclosure relates to a substrate processing apparatus for processing a substrate, for example, on which a plurality of elements is arranged.

In a technology of forming an element array including a plurality of elements on a substrate, to improve mechanical bonding strength and bonding stability between the plurality of elements and the substrate, a substrate processing apparatus is used to press the plurality of elements using a flat plate against the substrate on which the plurality of elements is arranged (Patent Document 1).

As a substrate processing apparatus that executes this type of processing, for example, a substrate processing apparatus which includes, a lower jig plate on which an object to be pressurized (a substrate on which a plurality of elements is arranged) is arranged, and an upper jig plate that pressurizes the object arranged on the lower jig plate is used. When the substrate on which the plurality of elements is arranged is pressed using the upper jig plate while on the lower jig plate, load is applied to the substrate, and accordingly, the plurality of elements can be pressed against the substrate.

In recent years, a size (height) of an element arranged on a substrate has become as small as about several μm. When parallelism, flatness, and the like of a surface of the lower jig plate or the upper jig plate vary by about several tens μm, it becomes difficult to apply a uniform load to the plurality of elements on the substrate using the upper jig plate, and a bonding failure may occur between the plurality of elements and the substrate.

Also, when the substrate is pressed using the upper jig plate, the lower jig plate and the like may undergo heat deformation due to heating of the upper jig plate or the lower jig plate, and it becomes difficult to apply uniform load to the substrate. Therefore, when no load is applied, even if parallelism, flatness, and the like of the surfaces of the upper jig plate and the lower jig plate can be secured to some extent, bonding failure may occur between the plurality of elements and the substrate due to heat deformation of the lower jig plate when pressure is applied to the substrate.

[Patent Document 1] Japanese Patent Application Laid-Open No. 2010-232234

BRIEF SUMMARY OF INVENTION

The present disclosure has been made in view of such circumstances, and an object of the present disclosure is to provide a substrate processing apparatus capable of applying uniform load to an object to be pressurized.

In order to achieve the above-mentioned object. a substrate processing apparatus for applying pressure on an object to be pressurized through an upper jig plate according to the first aspect of the present disclosure includes a lower jig plate arranged under the upper jig plate, and
an installation base provided on the lower jig plate, wherein
the object is placed on the installation base, and
the installation base is temporarily fixed to the lower jig plate in a deformable manner.

The substrate processing apparatus according to the first aspect of the present disclosure includes an installation base arranged on the lower jig plate and to which the object to be pressurized in arranged. Hence, the installation base is placed between the object and the lower jig plate. When pressure is applied to the object through the upper jig plate in such condition, even if the lower jig plate deforms (heat expands) due to heating of the lower jig plate, the effect of this is less likely to directly impact the object, and uniform load can be applied using the upper jig plate to the object arranged on the installation base.

Particularly, regarding the substrate processing apparatus according to the first aspect of the present disclosure, the installation base is temporarily fixed to the lower jig plate in a deformable manner. Thus, even in the case that the installation base is deformed (heat expanded) as heat of the lower jig plate transfers to the installation base while heating the lower jig plate, the lower jig plate without limiting the deformation of the installation base, thereby stress caused due to such deformation of the installation base can be released. Therefore, a sufficient surface accuracy (for example, flatness, smoothness, and so on) of the upper face of the installation base can be ensured, and the effect of the deformation of the installation base can be prevented from impacting the object arranged on the installation base. Hence, also from this point, uniform load can be applied to the object.

Note that, if the installation base is permanently fixed to the lower jig plate, when the installation base is deformed (heat expanded), the installation base is swollen from the point where the installation base is fixed, thus a surface accuracy (for example, flatness, smoothness, and so on) of the installation base may be deteriorated. However, in the substrate processing apparatus according to the present disclosure, as mentioned in above, the installation base is only temporarily fixed to the lower jig plate, thus such problem can be effectively prevented.

In order to achieve the above-mentioned object, the substrate processing apparatus for applying pressure on an object to be pressurized through an upper jig plate according to the second aspect of the present disclosure includes a lower jig plate arranged under the upper jig plate, and
an installation base provided on the lower jig plate. wherein
the object is placed on the installation base, and
the installation base is made of ceramics or glass As similar to the substrate processing apparatus according to the first aspect of the present disclosure, the substrate processing apparatus according to the second aspect of the present disclosure includes the installation base provided on the lower jig plate and to which the object to be pressurized in arranged. Thus, as mentioned in above, when pressure is applied to the object through the upper jig plate, even if the lower jig plate is deformed due to heating of the lower jig plate, the effect of this is less likely to directly impact the installation base, and uniform load can be applied using the upper jig plate to the object arranged on the installation base.

Particularly, regarding the substrate processing apparatus according to the second aspect of the present disclosure, the installation base is made of ceramics or glass. By using ceramics or glass as a material of the installation base, which are the material having smaller heat expansion coefficient compared to metals and so on used for the lower jig plate, even if heat of the lower jig plate is transferred to the installation base from the lower jig plate when it is heated, the deformation (heat expansion) of the installation base can be prevented. Therefore, the effect of the deformation of the installation base can be prevented from impacting the object arranged on the installation base, and uniform load can be applied to the object.

Also, from the point of processing accuracy, ceramics or glass can easily ensure surface accuracy (for example, flatness, smoothness, and so on) compared to metals. Therefore, by making the installation base using ceramics or glass, a sufficient surface accuracy of the installation base can be ensured.

Preferably, the substrate processing apparatus further includes a temporary fixing frame provided on the lower jig plate while contacting a part of an edge of the installation base. As the temporary fixing frame contacts with part of the edge of the installation base, the installation base can be temporarily fixed to the lower jig plate. Also, as the rest of edge part of the installation part does not contact with the temporary fixing frame, even if the installation base deforms due to heating of the lower jig plate, the installation base can freely deform in a plane direction while on the lower jig plate without limiting the deformation of installation base. Thus, stress caused by the deformation of the installation base can be released effectively. Also, by temporarily fixing the installation base to the lower jig plate using the temporary fixing frame, the position of the installation base can be determined easily.

Preferably, the temporary fixing frame comprises temporary fixing frames, and the temporary fixing frames are located at positions corresponding to one or more sides of the installation base.

By configuring as such, when the installation base is temporarily fixed to the lower jig plate, the position of the installation base can be determined with high precision. Also, by temporarily fixing one of the sides of the installation base using the temporary fixing frame, the position shifting of the installation base can be prevented effectively.

Preferably, the installation base includes a base slanted portion at the edge of the installation base, and the temporary fixing frame includes an inner slanted portion at an inner side of the temporary fixing frame where the edge of the installation base and the temporary fixing frame comes into contact.

By engaging the base slanted portion of the installation base and the inner slanted portion of the temporary fixing frame, the position shifting of the installation base can be prevented effectively, and also the installation base can be prevented effectively from being released of the lower jig plate.

Preferably, the substrate processing apparatus further includes a temporary fixing jig on the lower jig plate, wherein the temporary fixing jig includes a movable member in a movable manner, and the movable member is pushed towards the installation base from the temporary fixing jig due to a resilient force received from the temporary fixing jig, and the movable member is pushed back towards the temporary fixing jig from the installation base due to a stress received from the installation base.

By receiving resilient force from the temporary fixing jig, the movable member is pushed towards the installation base from the temporary fixing jig, and presses the edge of the installation base, thereby the installation base can be temporarily fixed to the lower jig plate while the movable member applies appropriate force to the installation base. Also, in the case that the installation base deforms while heating the lower jig plate, due to stress from the installation base, the movable member is pushed back towards the temporary fixing jig from the installation base (that is, pushed back in a direction of deformation of the installation base). Thereby, the installation base is freely deformed in a plane direction on the lower jig plate without limiting the deformation of the installation base, and stress caused by the deformation of the installation base can be released effectively.

The installation base is roughly a rectangular shape, the temporary fixing frame is provided at a position corresponding to a first side face of the installation base. and the temporary fixing jig is provided at a position corresponding to a second side face which is located at an opposite side of the first side face of the installation base.

When the substrate processing apparatus is configured as such, since the edge of the installation base contacts with the temporary fixing frame at the position corresponding to the first side face of the installation base, the installation base is temporarily fixed to the lower jig plate. Also, since the edge of the installation base contacts with the temporary fixing jig at the position corresponding to the second side face of the installation base, the installation base is temporarily fixed to the lower jig plate. Thereby, the first and second side faces of the installation base are held between the temporary fixing frame and the temporary fixing jig, and the installation base is temporarily fixed to the lower jig plate. As such, by using both the temporary fixing frame and the temporary fixing jig to temporarily fix the installation base to the lower jig plate, the temporary fixation of the installation base by either one of the temporary fixing frame or the temporary fixing jig can be reinforced by the other one.

The installation base is roughly a rectangular shape, the temporary fixing frame is provided at a position corresponding to a first corner of the installation base, and the temporary fixing jig is provided at a position corresponding to a second corner of the installation base which is at diagonally opposite position of the first corner.

When the substrate processing apparatus is configured as such, as the edge of the installation base contacts the temporary fixing frame at the position corresponding to the first corner of the installation base, the installation base is temporarily fixed to the lower jig plate. Also, as the edge of the installation base contacts the temporary fixing jig at the position corresponding to the second corner of the installation base, the installation base is temporarily fixed to the lower jig plate. Thereby, the corner of the installation base is held by the temporary fixing frame and the temporary fixing jig, and the installation base is temporarily fixed to the lower jig plate.

The installation base is roughly a circular shape, and the temporary fixing frame and the temporary fixing jig are respectively arranged at opposing positions in a radial direction of the installation base.

When the substrate processing apparatus has such configuration, the outer periphery of the installation base is held by the temporary fixing frame and the temporary fixing jig, thereby the installation base is temporarily fixed to the lower jig plate.

DETAILED DESCRIPTION OF INVENTION

Hereinafter, the present disclosure is described based on embodiments shown in the figures.

Figure 1A:
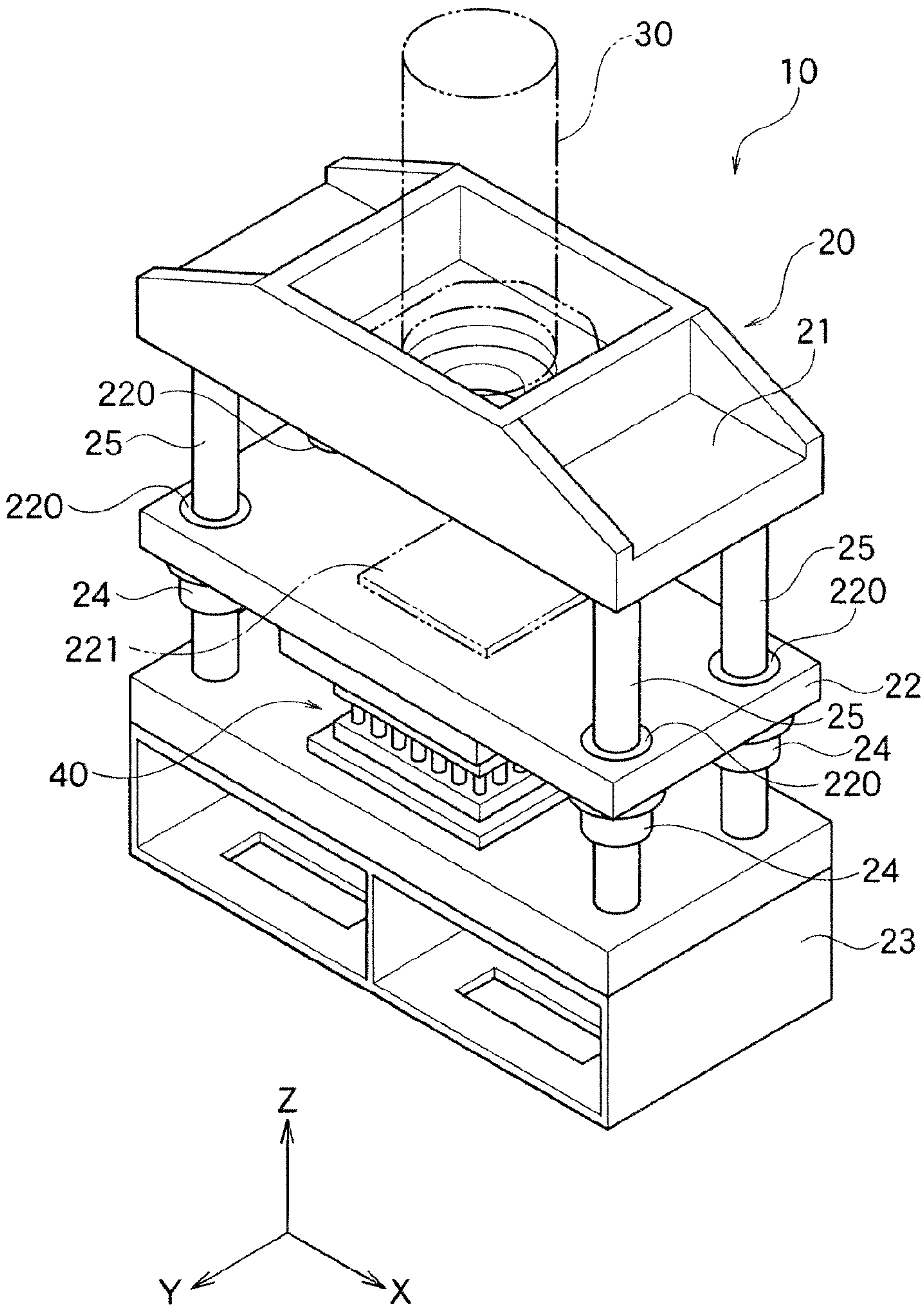
FIG. 1A is a perspective view of a substrate processing apparatus according to an embodiment of the present disclosure.

As shown in FIG. 1A, a substrate processing apparatus 10 according to an embodiment of the present disclosure is an apparatus for forming an element array 4 (FIG. 2) including elements 4*a*, 4*b*, and 4*c* on a substrate 2, and the substrate processing apparatus 10 presses the elements 4*a*, 4*b*, and 4*c* using a predetermined means against the substrate 2 on which the elements 4*a*, 4*b*, and 4*c* are arranged. Thereby, mechanical bonding strength and bonding stability between the substrate 2 and the elements 4*a*, 4*b*, and 4*c* can be enhanced. That is, the substrate processing apparatus 10 functions as a pressurizing portion (pressurizing device) when forming the element array 4 on the substrate 2.

As a material of the substrate 2, for example, a glass epoxy material may be mentioned. Note that, the material of the substrate 2 is not limited thereto, and for example, the substrate 2 may be made of $SiO_2$ or $Al_2O_3$ as a glass substrate; or it may be a flexible substrate made of elastomers such as polyimide, polyamide, polypropylene, polyetheretherketone, urethane, silicone, polyethylene terephthalate, polyethylene naphthalate, or so; furthermore, the substrate 2 may be a glass wool.

For example, a conductive bonding material, which is not shown in the figures, may be formed on the surface of the substrate 2 in advance. Due to anisotropic conductive particle connection, bump compression connection, or the like, this conductive bonding material electrically and mechanically connects the substrate 2 and the elements 4*a*, 4*b*, and 4*c*, and the conductive bonding material is cured by heating. As examples of the conductive bonding material, ACF, ACP, NCF, NCP, and the like may be mentioned. A thickness of the conductive bonding material may preferably be within a range of 1.0 to 10000 μm.

Circuit patterns are formed in a predetermined pattern on the substrate 2, and electrodes of the elements 4*a*, 4*b*, and 4*c* can be connected to the circuit wires via the conductive bonding material.

The elements 4*a*, 4*b*, and 4*c* are arranged on the substrate 2 in an array form. An array form means that the elements 4*a*, 4*b*, and 4*c* are arranged in rows and columns according to a predetermined pattern, and spaces in the row direction and the column direction may be the same or different.

The elements 4*a*, 4*b*, and 4*c* are arranged as RGB pixels on a substrate for a display, and are arranged on a light emitting substrate as a backlight emitter. The element 4*a* is a red light emitting element, the element 4*b* is a green light emitting element, and the element 4*c* is a blue light emitting element. Note that, the elements arranged on the substrate 2 are not limited to these elements.

The elements 4*a*, 4*b*, and 4*c* of the present embodiment are micro light emitting elements (micro LED elements), and the size (width×length) thereof may, for example, be within a range of 5 μm×5 μm to 50 μm×50 μm. The thicknesses (heights) of the elements 4*a* to 4*c* may for example be 50 μm or less.

The substrate processing apparatus 10 includes a pedestal 20, a load generating portion 30, and a substrate pressurizing portion 40. In the figures, X axis corresponds to a width direction of the pedestal 20, Y axis corresponds to a depth direction of the pedestal 20, and Z axis corresponds to a height direction of the pedestal 20.

The pedestal 20 may be formed of, for example, a metal case, and includes a pedestal upper portion 21, a movable pressurizing portion 22, a pedestal lower portion 23, a guide bush 24, and a guide shaft 25. The pedestal lower portion 23 constitutes a base portion (table) of the pedestal 20 and has a predetermined height. In the example shown in the figures, a hollow portion is formed at inside of the pedestal lower portion 23. However, the shape of the pedestal lower portion 23 is not limited thereto, and inside of the pedestal lower portion 23 may be solid.

Lower ends of the four guide shafts 25 are fixed (inserted) to the four corners of the pedestal lower portion 23. These guide shafts 25 each have a predetermined length and is arranged so that it is standing upright in the Z-axis direction. A lower end of each guide shaft 25 is fixed to the pedestal lower portion 23, and an upper end of each guide shaft 25 is fixed to the pedestal upper portion 21. The guide shaft 25 penetrates the four corners of the movable pressurizing portion 22 arranged between the pedestal upper portion 21 and the pedestal lower portion 23. These guide shafts 25 function to support the pedestal upper portion 21 and also function to support the movable pressurizing portion 22 so that it can slide up and down in the Z-axis direction.

Figure 1B:
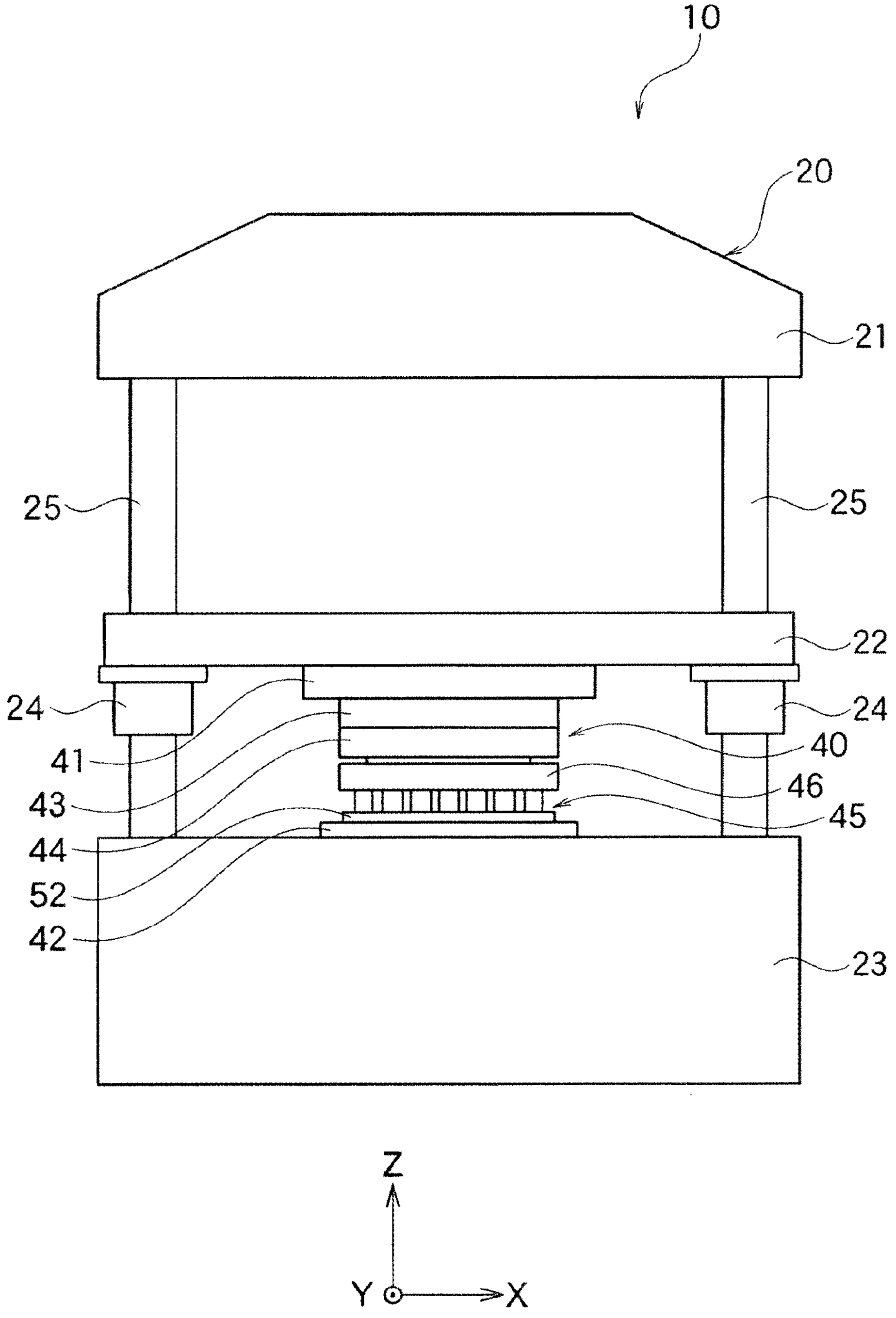
FIG. 1B is a side view of the substrate processing apparatus shown in FIG. 1A.

The movable pressurizing portion 22 is a plate-shaped body (rigid body) having a rectangular shape, and is positioned between the pedestal lower portion 23 and the pedestal upper portion 21. The movable pressurizing portion 22 is configured so that it can slide in a vertical direction along the four guide shafts 25 by receiving a load from the load generating portion 30. As shown in FIG. 1B, the movable pressurizing portion 22 contacts with an upper face of the substrate pressurizing portion 40 and applies pressure thereto, thereby for example, load of about 0 to 100 kN or so is applied to the substrate pressurizing portion 40. Preferably. the movable pressurizing portion 22 may be parallel to the substrate pressurizing portion 40 and is in contact with the substrate pressurizing portion, and parallelism A of the movable pressurizing portion 22 against the substrate pressurizing portion 40 may preferably be within a range of 1 μm≤A<2 μm.

As shown in FIG. 1A, four through holes 220 are respectively formed at four corners of the movable pressurizing portion 22, and four guide shafts 25 are respectively inserted into the through holes 220. Four guide bushes 24 are fixed to the lower face (the face on the Z-axis negative direction side) of the movable pressurizing portion 22 at positions matching the four through holes 220. When the movable pressurizing portion 22 is moving in the vertical direction, the guide bush 24 functions to improve sliding of the movable pressurizing portion 22 (reduces friction against the guide shaft 25) and also functions to easily determine the position of the guide shaft 25 against the axis of the through hole 220.

The pedestal upper portion 21 configures a ceiling portion of the pedestal 20. The upper ends of the four guide shafts 25 are fixed (inserted) to the four corners of the lower face of the pedestal upper portion 21. A load generating portion 30 is fixed to a center portion of the pedestal upper portion 21. The load generating portion 30 is constituted by a device such as a pressurizing cylinder, a servo press, a motor, an actuator, or so, and functions to apply load to the movable pressurizing portion 22. Note that, in order to prevent the figures from becoming too complicated, the detailed configuration of the movable pressurizing portion 22 is not shown, and the configuration is only partly shown.

The load generating portion 30 applies load to the movable pressurizing portion 22 by applying pressure to a center area 221 of the movable pressurizing portion 22 using a press head (not shown in the figures). Thereby, the movable pressurizing portion 22 moves downward and applies pressure to the substrate pressurizing portion 40. As a result, the substrate pressurizing portion 40 can apply load to the object (the substrate 2 on which the elements 4*a*, 4*b*, 4*c* are arranged).

Figure 3A:
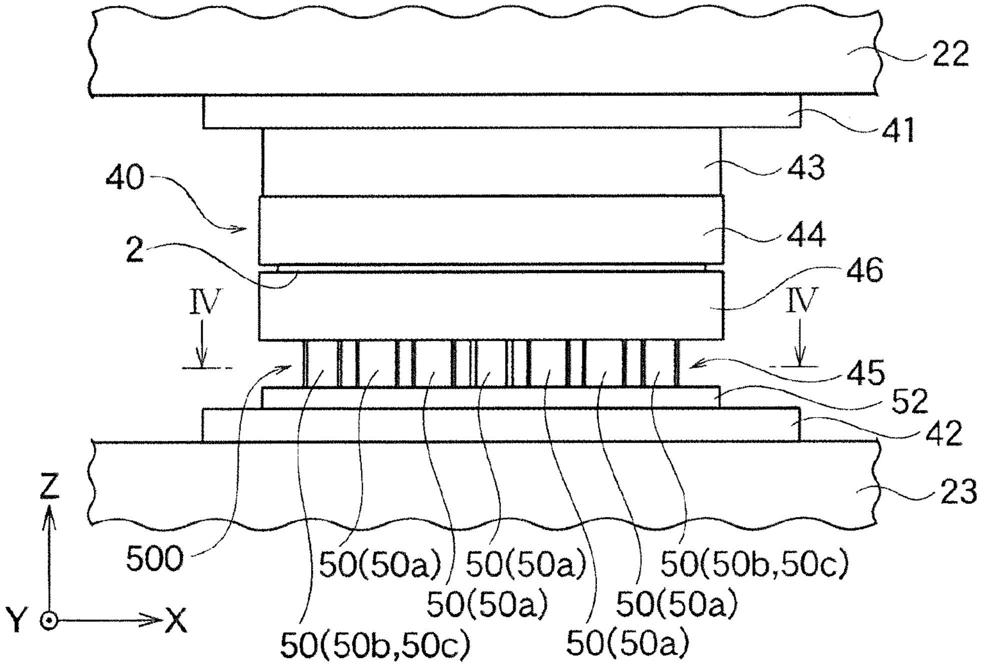
FIG. 3A is an enlarged side view of a substrate pressing portion of the substrate processing apparatus shown in FIG. 1A.

As shown in FIG. 3A, the substrate pressurizing portion 40 includes an upper stage 41, a lower stage 42, an upper mounting portion 43, an upper jig plate 44, a support member 45, a lower jig plate 46, and an installation base 47. The upper stage 41 is provided on the lower face of the movable pressurizing portion 22, and the lower stage 42 is provided on the upper face of the pedestal lower portion 23. A thickness of each of the upper stage 41 and the lower stage 42 is thicker than the thickness of the substrate 2. The upper stage 41 and the lower stage 42 have the same shapes, and a width of each of these in the X-axis direction is wider than widths of the upper mounting portion 43 and the support member 45 in the X-axis direction. Note that, the shapes of the upper stage 41 and the lower stage 42 are not limited to the shapes shown in the figures, and may be changed appropriately.

Preferably, the upper stage 41 may be formed of a flat plate-shaped body (rigid body) having a relatively high surface accuracy (for example, flatness, smoothness, or the like). For example, preferably a surface accuracy of the upper face of the upper stage 41 may be better than a surface accuracy of the lower face of the movable pressurizing portion 22; that is, in the upper surface of the upper stage 41, preferably unevenness may be less (i.e., smoother) and less angled against the horizontal plane (i.e., flatter) than the lower surface of the movable pressurizing portion 22.

As such, by fixing the upper stage 41 having excellent surface accuracy to the lower face of the movable pressurizing portion 22, when the upper mounting portion 43 is fixed to the lower face of the upper stage 41, the upper mounting portion 43 or the upper jig plate 44 mounted thereon can be stably arranged without being angled against the horizontal plane.

Preferably, the lower stage 42 may be a flat plate-shaped body (rigid body) and is preferably formed of a member having relatively high surface accuracy (for example, flatness, smoothness. or the like). For example, preferably the surface accuracy of the upper face of the lower stage 42 may be better than the surface accuracy of the upper face of the pedestal lower portion 23; that is, in the upper surface of the lower stage 42, preferably unevenness may be less (i.e., smoother) and less angled against the horizontal plane (i.e., flatter) than the upper surface of the pedestal lower portion 23.

As such, by fixing the lower stage 42 having excellent surface accuracy to the upper face of the pedestal lower portion 23, when the support member 45 is fixed to the upper face of the lower stage 42, the support member 45 or the lower jig plate 46 supported by the support member 45 can be stably arranged without being angled against the horizontal plane.

The upper mounting portion 43 has an appearance of a flat plate-like shape and is fixed to the lower face of the upper stage 41. The upper jig plate 44 is mounted on the upper mounting portion 43. The upper mounting portion 43 functions to support the upper jig plate 44.

The upper jig plate 44 is a flat plate-shaped body (rigid body) and is fixed (mounted) to the lower face of the upper mounting portion 43. The upper jig plate 44 functions to apply pressure on the substrate 2 arranged on the installation base 47. A heating function (for example, a heater) is built in the upper jig plate 44, and when the substrate 2 is pressed by the upper jig plate 44, the substrate 2 can be heated by the upper jig plate 44. For example, when the conductive bonding material is used to connect the elements 4*a*, 4*b*, and 4*c* with the substrate 2, the elements 4*a*, 4*b*, and 4*c* can be firmly connected to the substrate 2 by heating the substrate 2, and bonding force between the substrate 2 and the elements 4*a*, 4*b*, and 4*c* arranged thereon can be enhanced.

Preferably, the upper jig plate 44 may be formed of a member having relatively high surface accuracy. Preferably, the surface accuracy of the lower face of the upper jig plate 44 may be, for example, better than the surface accuracy of the lower face of the upper stage 41; that is, in the lower surface of the upper jig plate 44, preferably unevenness may be less (i.e., smoother) and less angled against the horizontal plane (i.e., flatter) than the lower surface of the upper stage 41. A surface roughness Ra of the surface (particularly, the lower face) of the upper jig plate 44 may particularly preferably be Ra≤1 μm.

As such, by improving the surface accuracy of the upper jig plate 44, when the substrate 2 arranged on the installation base 47 is pressed by the lower face of the upper jig plate 44, unevenness of load applied to the substrate 2 can be reduced, and a uniform load can be applied to the elements 4*a*, 4*b*, and 4*c* arranged on the substrate 2.

The lower jig plate 46 is a flat plate-shaped body (rigid body) and it is supported by the support member 45. The lower jig plate 46 and the upper jig plate 44 are about the same shapes, and the lower jig plate 46 and the upper jig plate 44 face against each other. The installation base 47 can be arranged on the lower jig plate 46. As similar to the upper jig plate 44, a heating function (for example, a heater) is built in the lower jig plate 46, and when the substrate 2 is pressed by the upper jig plate 44, the substrate 2 arranged on the installation base 47 can be heated by the lower jig plate 46 (and the upper jig plate 44).

Preferably, the lower jig plate 46 may be formed of a member having relatively high surface accuracy. Preferably, the surface accuracy of the upper face of the lower jig plate 46 may be better than the surface accuracy of the upper surface of the lower stage 42; that is, in the upper face of the lower jig plate 46, preferably unevenness may be less (i.e., smoother) and less angled against the horizontal plane (i.e., flatter) than the upper surface of the lower stage 42.

A surface roughness Ra of the surface (particularly, the upper face) of the lower jig plate 46 may particularly preferably be Ra≤1 μm, as similar to the surface roughness Ra of the surface of the upper jig plate 44. Also, parallelism A between the lower jig plate 46 and the upper jig plate 44 may preferably be A≤1 μm. The same applies to the installation base 47 described in below.

As such, by improving the surface accuracy of the lower jig plate 46 (or the installation base 47), when the installation base 47 is arranged on the lower jig plate 46, a parallelism of the installation base 47 against a horizontal plane can be improved. Also, when the substrate 2 arranged on the installation base 47 is pressed by the lower face of the upper jig plate 44, the lower face of the upper jig plate 44 and the substrate 2 become parallel to each other (contact with each other), and the above-mentioned effect of uniform distribution of load applied to the substrate 2 can be enhanced.

Even if a certain level of surface accuracy of the upper jig plate 44 and the lower jig plate 46 is secured, when the substrate 2 is pressurized using the upper jig plate 44, the lower jig plate 46 is bent to some extent, and the lower jig plate 46 and the upper jig plate 44 may not have sufficient contact property (adhesive property). Thus, it may become difficult to apply uniform load to the substrate 2 (or to the elements 4*a*, 4*b*, and 4*c* arranged on the substrate 2), and the bonding condition between the substrate 2 and the elements 4*a*, 4*b*, and 4*c* may vary.

That is, in relativity, the substrate 2 has an area where load changes in decreasing direction when a small surface pressure is applied, and an area where load changes in increasing direction when a large surface pressure is applied, hence load distribution of the substrate 2 becomes non-uniform. Therefore, in the substrate processing apparatus 10 according to the present embodiment, the support member 45 is provided with a means for solving the non-uniform load distribution when pressure is applied to the substrate 2. Hereinafter, the support member 45 will be described in detail.

The support member 45 is fixed to the upper face of the lower stage 42 and supports the lower jig plate 46. That is, in the present embodiment, the lower jig plate 46 is provided above the lower stage 42 by having the support member 45 in between. The support member 45 is configured so that it can adjust the amount of load applied on the substrate 2 which is caused by bending of the above-mentioned lower jig plate 46; and the support member 45 provides a support force to the lower jig plate 46 in accordance with the in-plane distribution of the load applied to the lower jig plate 46.

For example, in the lower jig plate 46, the closer a position is to a center of the lower jig plate 46, the more bent the lower jig plate 46 is in a concave shape and protrudes downward, and the surface pressure applied to the position becomes relatively small. Thus, load applied to the lower jig plate 46 may become relatively small in some cases. As such, at the position where load applied to the lower jig plate 46 is relatively small, the support member 45 provides a relatively large supporting force to the lower jig plate 46. Thereby, at a position close to the center area of the lower jig plate 46, the lower jig plate 46 bends less, and load applied to the lower jig plate 46 can be increased. As a result, load applied to the substrate 2 arranged on the installation base 47 at this position can be increased.

Also, as the position of the lower jig plate 46 is farther away from the center area thereof, the surface pressure applied to the position becomes relatively large, and the applied load may become relatively large. As such, at a position where load applied to the lower jig plate 46 becomes relatively large, the support member 45 provides a small supporting force to the lower jig plate 46. Thereby, at the position farther away from the center area of the lower jig plate 46, the lower jig plate 46 bends easily, and load applied to the lower jig plate 46 can be reduced. As a result, load applied to the substrate 2 arranged on the installation base 47 at the position can be reduced.

As such, the support member 45 adjusts bending of the lower jig plate 46 so that load applied to each position of the lower jig plate 46 are balanced out, and uniform load can be applied to the substrate 2. Hereinafter, a specific means for providing the lower jig plate 46 with a supporting force in accordance with the in-plane distribution of load of the lower jig plate 46 using the support member 45 will be described.

The support member 45 includes a collective body 500 of columnar members 50 and an installation portion 52 where the columnar members 50 are placed. The columnar members 50 each have a columnar shape and function to support the lower jig plate 46. The shape of columnar member 50 is not limited thereto, and it may be a triangular prism shape, a square prism shape, any another polygonal prism shape, a cone shape, a triangular pyramid shape, or any another polygonal pyramid shape. The columnar member 50 may be a hollow shape.

Figure 4:
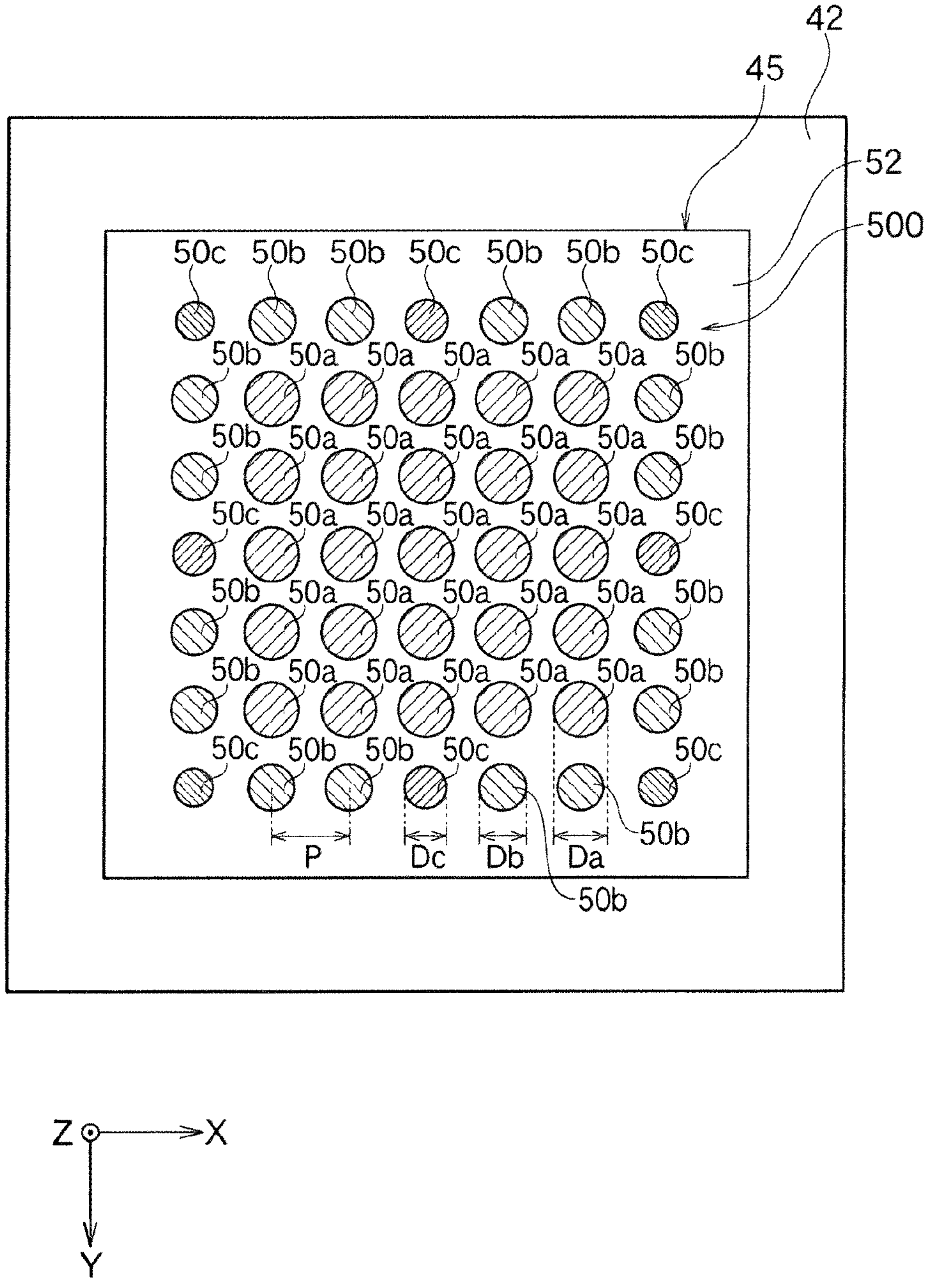
FIG. 4 is a cross sectional view of the substrate pressing portion shown in FIG. 3A along a line IV-IV.

Preferably, the columnar members 50 may be formed of a resiliently deformable solid body. As shown in FIG. 4, for example, the columnar members 50 are orderly arranged in a matrix form of 7 rows and 7 columns on the installation portion 52, and the columnar members 50 are arranged by taking predetermined space between each other in the X-axis direction and the Y-axis direction. In the example shown in the figures, the center distances between each of the columnar members 50 are substantially the same, and the columnar members 50 are arranged at equal space between each other, but the space between the columnar members 50 do not necessarily have to be the same. Also, when viewed from above, the columnar members 50 are evenly arranged from one end to the other end throughout X axis direction and Y axis direction of the installation portion 52, but the columnar members 50 may be unevenly distributed (concentrated) in part of the installation portion 52.

Also, the columnar members 50 may be arranged randomly on the installation portion 52 or may be arranged concentrically. The arrangement of the columnar members 50 is appropriately determined according to the in-plane distribution of the load applied to the lower jig plate 46.

In the present embodiment, the columnar members 50 do not necessarily all have the same cross-sectional areas (cross sectional areas parallel to the XY plane), and the columnar members 50 include a columnar member 50 having a relatively large cross-sectional area (a columnar member 50*a*), a columnar member 50 having a relatively small cross-sectional area (a columnar member 50*c*), and a columnar member 50 having a cross sectional area which is between these two (a columnar member 50*b*). That is, the columnar members 50 are formed of a plurality of members having different shapes.

The columnar members 50*a* are arranged at positions where load applied to the lower jig plate 46 is relatively small, and the columnar members 50*b* and 50*c* are arranged at positions where load applied to the lower jig plate 46 is relatively large. That is, the columnar members 50*a*, 50*b*, and 50*c* are arranged in accordance with the in-plane distribution of load applied to the lower jig plate 46.

In the example shown in the figures, the columnar members 50*a* are arranged on the installation portion 52 in a matrix form of 5 rows and 5 columns. In below, the columnar member 50*a* positioned at the center of the collective body of columnar members 50*a* may be specifically referred to as a columnar member 50*a*1. The columnar member 50*a*1 is arranged roughly at the center of the lower jig plate 46 (directly below the pressurizing shaft of the load generating portion 30). Note that, the pressurizing shaft may be configured of a single shaft or a plurality of shafts.

The columnar members 50*b* and the columnar members 50*c* are arranged at the outside of the collective body of columnar members 50*a* (the outermost periphery of the collective body 500) and surround the collective body. At the outermost periphery of the collective body 500, four columnar members 50*c* are arranged at four corners, and four more columnar members 50*c* are arranged between said four columnar members 50*c*. Further, two columnar members 50*b* are arranged in pairs between the columnar members 50*c*. The arrangement of the columnar members 50*a*, 50*b*, and 50*c* shown in FIG. 4 is an example, and the arrangement thereof may be appropriately changed.

When a width (diameter) of the columnar member 50*a* is Da, a width (diameter) of the columnar member 50*b* is Db, and a width (diameter) of the columnar member 50*c* is Dc, then Da>Db>Dc is satisfied. The diameters Da, Db, and Dc are preferably within a range of 10 to 20 mm. Also, a ratio Da/Dc is preferably within a range of 2/1 to 1.5/1 which is a ratio between the diameter Da of the columnar member 50*a* having largest diameter to the diameter Dc of the columnar member 50*c* having smallest diameter. By setting the diameter (thickness) of each of the columnar members 50*a*, 50*b*, and 50*c* within such range, each of the columnar members 50*a*, 50*b*, and 50*c* can bend appropriately in accordance with the magnitude or in-plane distribution of load applied to the lower jig plate 46.

Note that, among the columnar members 50*a*, a diameter of the columnar member 50*a*1 may be larger than that of other columnar members 50*a* so that the columnar member 50*a*1 becomes harder to bend compared to other columnar members 50*a*.

A center distance (pitch) P between the columnar members 50 may preferably be within a range of 20 to 50 mm, and more preferably within a range of 20 to 25 mm. By setting the center distance P between the columnar members 50 within such range, the columnar members 50*a*, 50*b*, and 50*c* can evenly support the entire lower jig plate 46, and the lower jig plate 46 can be supported with an appropriate supporting force. In the present embodiment, at the positions where the columnar members 50*a*, 50*b*, and 50*c* are arranged, a supporting force can be locally provided to the lower jig plate 46 by the columnar members 50*a*, 50*b*, and 50*c*.

A length L of the columnar members 50 may preferably be within a range of 20 to 50 mm, and more preferably within a range of 20 to 25 mm. The length L of the columnar members 50 may be substantially the same as the height of the lower jig plate 46.

When a cross sectional area of the columnar member 50*a* is Sa, a cross sectional area of the columnar member 50*b* is Sb, and a cross sectional area of the columnar member 50*c* is Sc, then Sa>Sb>Sc is satisfied. The cross-sectional area Sa of the columnar member 50*a* arranged at a position where load applied to the lower jig plate 46 is relatively small is larger than the cross-sectional areas Sb and Sc of the columnar members 50*b* and 50*c* arranged at positions where load applied to the lower jig plate 46 is relatively large.

In the case that the lower jig plate 46 is supported by the columnar members 50*a*, 50*b*, and 50*c*, and load is applied to the lower jig plate 46 (FIG. 3A) by applying pressure to the substrate 2 using the upper jig plate 44 (FIG. 3A). and also load is applied to the columnar members 50*a*, 50*b*, and 50*c*; a relatively small amount of strain (compression strain in the Z-axis negative direction) is generated to in the columnar member 50*a*. At the same time, relatively large amount of strain (compression strain in the Z-axis negative direction) is generated to the columnar members 50*b* and 50*c*. As such, in the present embodiment, when load is applied to the columnar members 50*a*, 50*b*, and 50*c*, strain is generated to the columnar members 50*a*, 50*b*, and 50*c* by an amount of strain in accordance with these cross-sectional area Sa, Sb, and Sc.

The columnar members 50*a*, 50*b*, and 50*c* can freely expand and contract along an extending direction thereof by deforming in accordance with the cross-sectional area thereof when load is applied. The moment at which the columnar members 50*a*. 50*b*, and 50*c* deform by receiving load is roughly the same as the moment at which the lower jig plate 46 receives load from the upper jig plate 44, the moment at which the upper jig plate 44 receives load from the movable pressurizing portion 22, or the moment at which the movable pressurizing portion 22 receives load from the load generating portion 30. When no load is applied to the columnar members 50*a*, 50*b*, and 50*c*, the columnar members 50*a*, 50*b*, and 50*c* are not deformed and these are at the original state.

In the present embodiment, the amount of strain of the columnar member 50*a* arranged at a position where a relatively small load is applied to the lower jig plate 46 is smaller than the amounts of strain of the columnar members 50*b* and 50*c* arranged at positions where a relatively large load is applied to the lower jig plate 46. That is, in the columnar members 50, a strain gradient is formed in accordance with the in-plane distribution of the load applied to the lower jig plate 46: and the closer the columnar member 50 is arranged to the center of the lower jig plate 46, the smaller the strain is; and the closer the columnar member 50 is arranged to the outer periphery of the lower jig plate 46, the larger the strain is.

Figure 3B:
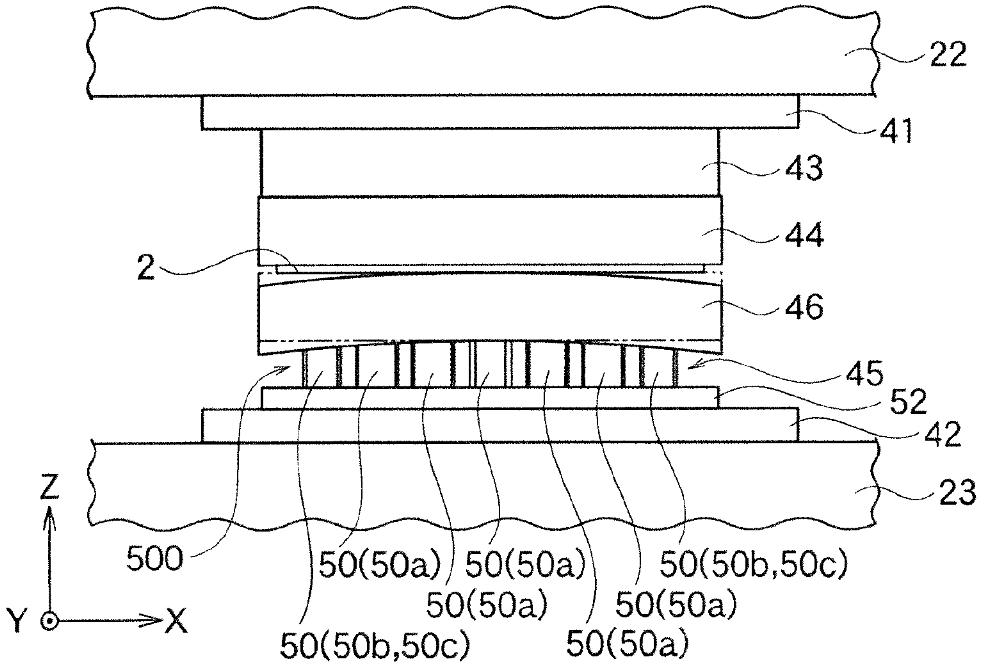
FIG. 3B is an enlarged side view showing when the lower jig plate of the substrate pressing portion shown in FIG. 3A is bent.

By supporting the lower jig plate 46 with the columnar member 50*a* having a relatively small strain amount at a position where load applied to the lower jig plate 46 is relatively small, a relatively large supporting force can be provided to the lower jig plate 46 by the columnar member 50*a* so that the lower jig plate 46 bend less, and the amount of bending of the lower jig plate 46 can be adjusted to be small amount in accordance with the strain amount of columnar member 50*a*. That is, if no measures are taken, the center area of the lower jig plate 46 is bent in a concave shape, but in the present embodiment, bending becomes relatively small as shown in FIG. 3B. As a result, load applied to the lower jig plate 46 can be increased, and the amount of load applied to the substrate 2 arranged on the lower jig plate 46 (the installation base 47) can be increased.

Also, by supporting the lower jig plate 46 with the columnar members 50*b* and 50*c* having relatively large strain amounts at position where the load applied to the lower jig plate 46 is relatively large, relatively small supporting force can be provided to the lower jig plate 46 by the columnar members 50*b* and 50*c*, so that the lower jig plate 46 bends easily, and bending of the lower jig plate 46 can be adjusted to a large amount of bending in accordance with the amounts of strain of the columnar members 50*b* and 50*c*. That is, if no measures are taken. the outer peripheral area of the lower jig plate 46 is hardly bent, but in the present embodiment, bending becomes relatively large as shown in FIG. 3B. As a result, load applied to the lower jig plate 46 can be reduced, and the amount of load applied to the substrate 2 arranged on the lower jig plate 46 (the installation base 47) can be reduced.

Figure 5A:
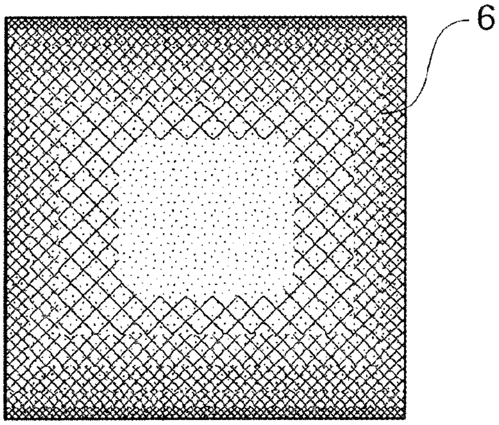
FIG. 5A is a diagram showing an in-plane distribution of load applied to a pressure sensitive paper when the lower jig plate is not supported by columnar members.
Figure 5B:
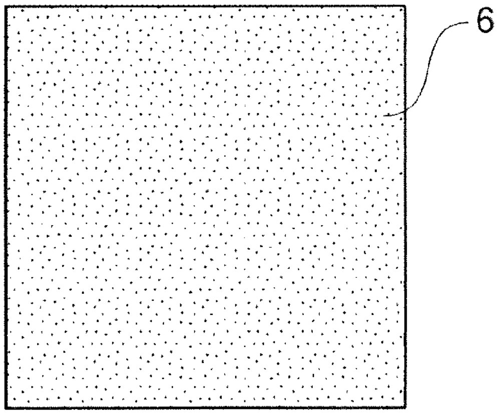
FIG. 5B is a diagram showing an in-plane distribution of load applied to the pressure sensitive paper when the lower jig plate is supported by the columnar members.

FIG. 5A is a diagram showing a distribution of load applied to the pressure sensitive paper 6 arranged on the lower jig plate 46 when the lower jig plate 46 (FIG. 3A) is mounted on a flat plate-shaped member (a member corresponding to the upper mounting portion 43) without using the support member 45 of the present embodiment (that is, FIG. 5A shows a comparative example). Also, FIG. 3B is a diagram showing a distribution of load applied to the pressure sensitive paper 6 arranged on the lower jig plate 46 when the lower jig plate 46 is supported by the support member 45 of the present embodiment (that is, FIG. 5B shows an example). In FIGS. 5A and 5B, the distribution of the load applied to the pressure sensitive paper 6 matches the distribution of load applied to the substrate 2. In these figures, a portion with a darker color indicates that a relatively large load is applied, and a portion with a lighter color indicates that a relatively small load is applied. Note that, the pressure sensitive paper is arranged directly on the lower jig plate 46 without placing the installation base 47 in between.

As shown in FIG. 5A, in a comparative example, the closer it is to the center area of the pressure sensitive paper 6, load applied to the pressure sensitive paper 6 decreases in relativity; on the other hand, is the closer it is to the outer peripheral area of the pressure sensitive paper 6, load applied to the pressure sensitive paper 6 increases in relativity. That is, in a comparative example, a relatively large bending is generated around the center area of the lower jig plate 46, while a relatively small bending is generated around the outer periphery of the lower jig plate 46.

On the contrary, as shown in FIG. 5B, in an example, load is uniformly applied to the pressure sensitive paper 6 at each position of the pressure sensitive paper 6. In the present embodiment, as shown in FIG. 3B, by bending the lower jig plate 46 so that the load applied to each position of the lower jig plate 46 is balanced out, the in-plane distribution of load applied to the lower jig plate 46 can be adjusted to be uniform as shown in FIG. 5B, and the load can be uniformly applied to the substrate 2 arranged on the lower jig plate 46.

The example shown in FIG. 4 shows an embodiment in which the in-plane distribution of load applied to the lower jig plate 46 is adjusted based on the difference of the strain amounts of the columnar members 50*a*, 50*b*, and 50*c* having different cross-sectional areas, however the embodiment for carrying out such adjustment is not limited thereto.

Figure 6A:
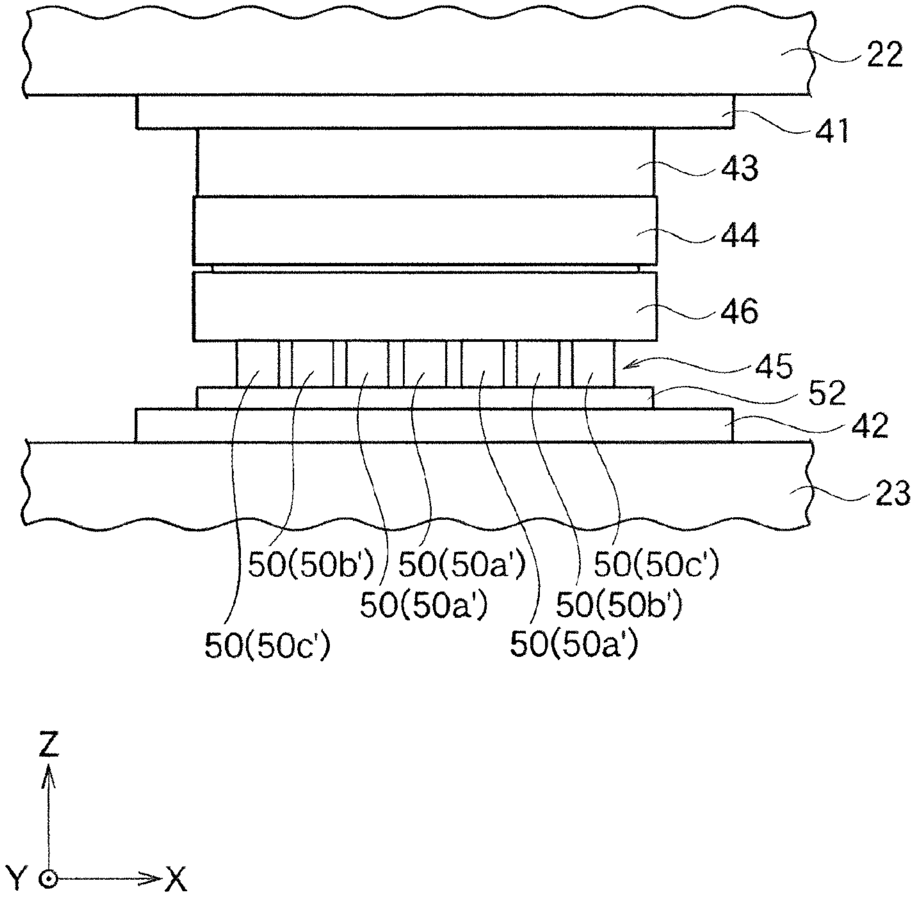
FIG. 6A is an enlarged side view showing a modification example of the support member shown in FIG. 3A.

For example, the support member 45 may adjust the in-plane distribution of load applied to the lower jig plate 46 by differences in the strain amounts based on the Young's moduli of the columnar members 50 when a certain load is applied. In the example shown in FIG. 6A, the columnar members 50*a*', 50*b*', and 50*c*' are made of members having different Young's moduli (mechanical strengths) or different hardness.

More specifically, the columnar member 50*a*' having a relatively large Young's modulus is arranged near the center area of the lower jig plate 46 where load applied to the lower jig plate 46 is relatively small. Also, the columnar member 50*c*' having a relatively small Young's modulus is arranged near the outer peripheral area of the lower jig plate 46 where load applied to the lower jig plate 46 is relatively large. Also, the columnar member 50*b*' having a relatively moderate Young's modulus is arranged at a position between the center area and the outer peripheral area of the lower jig plate 46 where load applied to the lower jig plate 46 is relatively moderate. That is, the Young's modulus of each of the columnar members 50*a*', 50*b*', and 50*c*' is in accordance with the in-plane distribution of load applied to the lower jig plate 46, and the Young's moduli of the columnar members 50 have a gradient in which the Young's moduli become smaller at a position farther away from the center area of the lower jig plate 46. Note that, the cross-sectional areas and shapes of the columnar members 50*a*', 50*b*', and 50*c*' are all the same.

In this case, when the lower jig plate 46 is supported by the plurality of columnar members 50*a*', 50*b*', and 50*c*', load is applied to the lower jig plate 46 by applying pressure to the substrate 2 using the upper jig plate 44. Along with that, load is applied to the columnar members 50*a*', 50*b*', and 50*c*', then the columnar members 50*a*', 50*b*', and 50*c*' are strained in accordance with the Young's moduli of the columnar members 50*a*', 50*b*', and 50*c*', and the lower jig plate 46 bends by the amount of bending in accordance with the stain amounts of the columnar members 50*a*', 50*b*', and 50*c*'.

That is, since a relatively small strain is generated to the columnar member 50*a*', a relatively small bending is generated to the center area of the lower jig plate 46. Also, since a relatively large strain is generated to the columnar member 50*c*', a relatively large bending is generated to the outer peripheral area of the lower jig plate 46. Also, since a relatively moderate strain is generated to the columnar member 50*b*', a relatively moderate bending is generated at a position between the center area and the outer peripheral area of the lower jig plate 46.

As described above, the columnar members 50*a*', 50*b*', and 50*c*' are strained in accordance with the in-plane distribution of load applied to the lower jig plate 46, and the lower jig plate 46 bends in accordance with the strain amounts of the columnar members 50*a*', 50*b*', and 50*c*', thereby the lower jig plate 46 can bend so that load applied to each position of the lower jig plate 46 is balanced out (see FIG. 3B), and a uniform load can be applied to the substrate 2.

The Young's moduli E of the columnar members 50 may preferably be within a range of 100 GPa to 500 GPa. Also, a ratio Emax/Emin may preferably be within a range of 2/1 to 4/1 in which Emax represents the Young's modulus E of the columnar member 50*a*' having the largest Young's modulus and Emin represents the Young's modulus E of the columnar member 50*c*' having the smallest Young's modulus. By setting the range of the Young's modulus of each of the columnar members 50*a*', 50*b*', and 50*c*' within such range, the columnar members 50*a*', 50*b*', and 50*c*' can be bent appropriately in accordance with the in-plane distribution of the load applied to the lower jig plate 46. Note that, the support member 45 may include another columnar member 50 having a Young's modulus different from that of the columnar members 50*a*', 50*b*', and 50*c*'.

As a material having the Young's modulus described in above, the columnar members 50 are preferably made of a material such as carbon steel, silicon nitride, or silicon carbide.

Figure 6B:
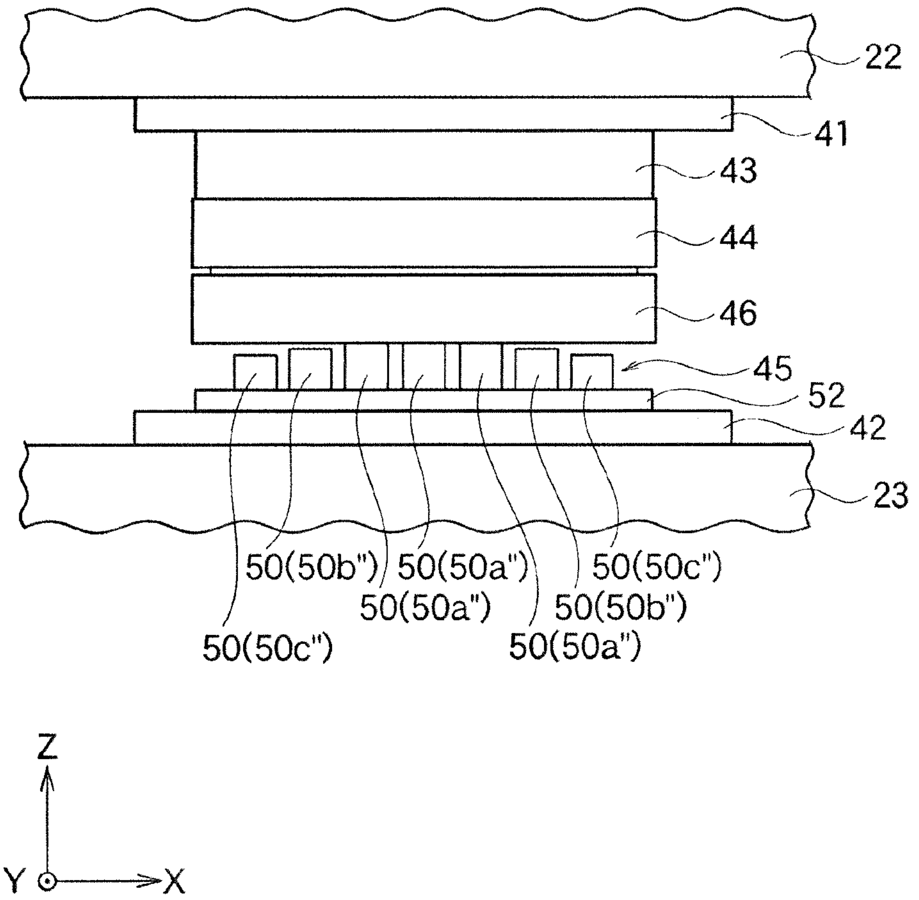
FIG. 6B is an enlarged side view showing another modification example of the support member shown in FIG. 3A.

Also, for example, the support member 45 may adjust the in-plane distribution of load applied to the lower jig plate 46 by differences in lengths of the columnar members 50. In the example shown in FIG. 6B, columnar members 50*a*", 50*b*", and 50*c*" are formed of members having different lengths, and a height distribution is formed at a height position of an upper end of the columnar members 50*a*", 50*b*", and 50*c*".

More specifically, the columnar member 50*a*" having a relatively long length is arranged closer to the center area of the lower jig plate 46 where the load applied to the lower jig plate 46 is relatively small. Also, the columnar member 50*c*" having a relatively short length is arranged around the outer peripheral area of the lower jig plate 46 where the load applied to the lower jig plate 46 is relatively large. Also, a columnar member 50*b*" having a relatively moderate length is arranged at a position between the center area and the outer peripheral area of the lower jig plate 46 where the load applied to the lower jig plate 46 is relatively moderate. That is, the length of each of the columnar members 50*a*", 50*b*", and 50*c*" has a value which matches the in-plane distribution of the load applied to the lower jig plate 46, and the lengths of the columnar members 50 (the height position of the upper end) are arranged so that a height gradient is formed which becomes shorter as it is further away from the center area of the lower jig plate 46. Note that, the cross-sectional areas and Young's moduli of the columnar members 50*a*", 50*b*", and 50*c*" are all the same.

In this case, when the lower jig plate 46 is supported by the columnar members 50*a*", 50*b*", and 50*c*", load is applied to the lower jig plate 46 by applying pressure to the substrate 2 using the upper jig plate 44. Along with that, load is applied to the columnar members 50*a*", 50*b*", and 50*c*", and the lower jig plate 46 bends in accordance with the lengths of the columnar members 50*a*", 50*b*", and 50*c*".

That is, relatively small bending is generated to the area close to the center of the lower jig plate 46 where the columnar member 50*a*" is arranged. Also, a relatively large bending is generated to the outer peripheral area of the lower jig plate 46 where the columnar member 50*c*" is arranged. Also, a relatively moderate bending is generated at a position between the center area and the outer peripheral area of the lower jig plate 46 where the columnar member 50*b*" is arranged. As such, the columnar members 50*a*", 50*b*", and 50*c*" having different lengths are arranged in accordance with the in-plane distribution of load applied to the lower jig plate 46, and the lower jig plate 46 is bent by the amount of bending in accordance with the lengths of the columnar members 50*a*", 50*b*", and 50*c*", thereby the lower jig plate 46 bends in a way that the load applied to each position of the lower jig plate 46 is balanced out (see FIG. 3B), and a uniform load can be applied to the substrate 2. Note that, the support member 45 may include other columnar members 50 having a length different from that of the columnar members 50*a*", 50*b*", and 50*c*".

Note that, bending of the lower jig plate 46 can be done more easily and more accurately by adjusting the material (Young's modulus) or the diameter (cross-sectional area) of the columnar members 50 than by adjusting the height of the columnar members 50.

The arrangement of the columnar members 50 is not limited to the example shown in FIG. 4, and for example, the columnar members 50 may be arranged as shown in FIGS. 7A, 8A, 9A, and 10A. In the example shown in FIG. 7A, nine columnar members 50*d* are arranged in a matrix form of 3 rows and 3 columns in a center area 520 of the installation portion 52 which is indicated by a dotted line. Also, columnar members 50*e* are locally arranged at outside the center area 520 of the installation portion 52. The columnar members 50*d* and 50*e* are arranged so as to extend radially from the center of the installation portion 52. The columnar members 50*d* are arranged in a relatively high density at the center area 520 of the installation portion 52. and the columnar members 50*e* are arranged in a relatively low density at outside of the center area 520 of the installation portion 52.

Figure 7A:
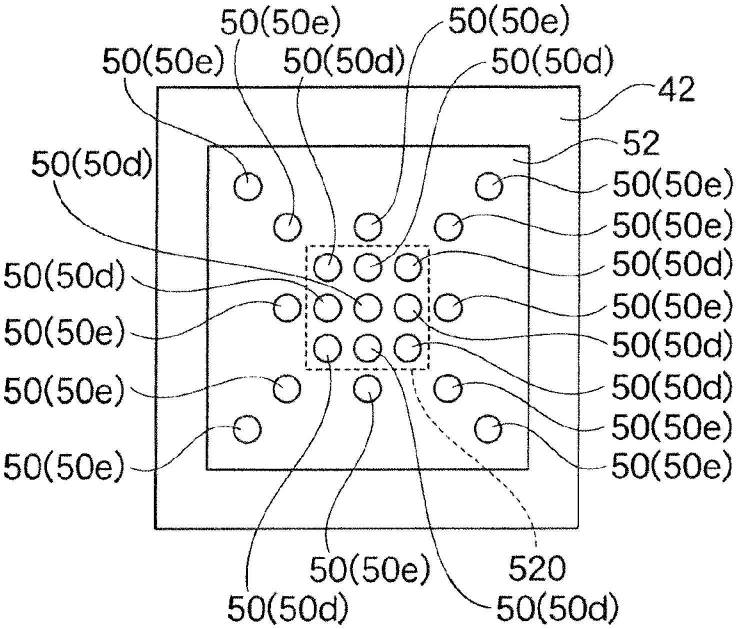
FIG. 7A is a diagram showing another arrangement example of the columnar members.

That is, in the example shown in FIG. 7A, at a position (central region 520) where load applied to the lower jig plate 46 (FIG. 1B) is relatively small, a relatively more columnar members 50*d* are densely arranged than at a position (outside of the center area 520) where the load applied to the lower jig plate 46 is relatively large.

Figure 7B:
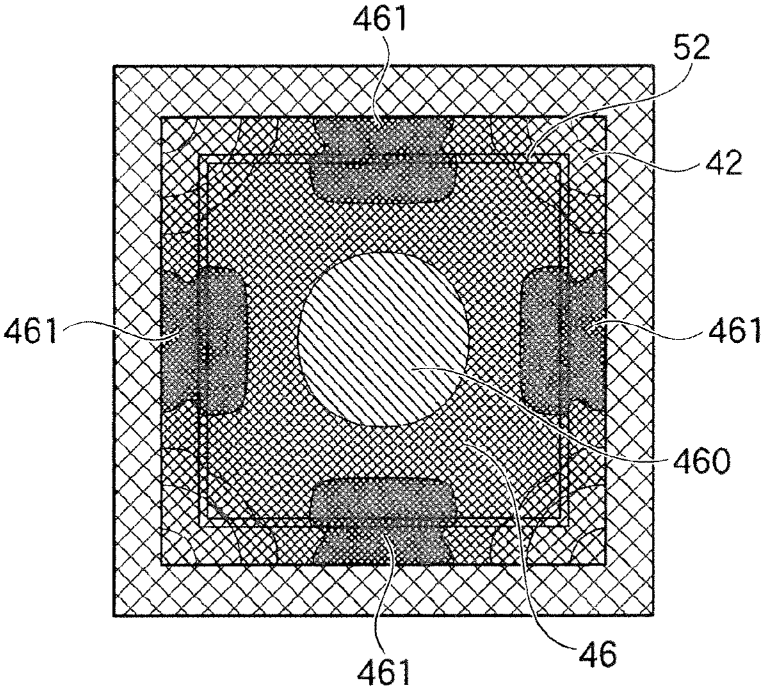
FIG. 7B is a diagram showing an in-plane distribution of load applied to the substrate or the lower jig plate when the columnar members are arranged in an arrangement shown in FIG. 7A.

FIG. 7B shows a result of analyzing a distribution of bending generated to the lower jig plate 46 using CAE (Computer Aided Engineering) analysis when the lower jig plate 46 is supported by the columnar members 50*d* and 50*e* shown in FIG. 7A. In these figures, a portion with a darker color indicates a relatively large bending, and a portion with a lighter color indicates that a relatively small deflection.

As shown in FIG. 7B, since the center area 460 of the lower jig plate 46 which matches the center area 520 of the installation portion 52 is supported by a relatively more columnar members 50*d*, at the center area 460, a relatively large supporting force is provided to the lower jig plate 46 by the columnar members 50*d*, thus the lower jig plate 46 bends less. That is, in the center area 460, bending generated to the lower jig plate 46 is adjusted to a small bending amount in accordance with the density (number) of the columnar members 50*d*, and a relatively small bending is generated to the center area 460. As a result, the load applied to the lower jig plate 46 increases.

On the other hand, since the area outside the center area 460 of the lower jig plate 46 is supported by a relatively fewer columnar members 50*e*, in this area, a relatively small supporting force is provided to the lower jig plate 46 by the columnar members 50*e*, thus the lower jig plate 46 tends to bend easily. That is, in the area outside the center area 460, bending generated to the lower jig plate 46 is adjusted to a large bending amount in accordance with the density (number) of the columnar members 50*e*, and a relatively large bending is generated to the area. As a result, the load applied to the lower jig plate 46 decreases.

In particular, in the side area 461 of the lower jig plate 46 which is not supported by the columnar member 50*e*, the lower jig plate 46 bends particularly easily, and the amount of bending of the lower jig plate 46 is particularly large compared to other areas.

As such, by arranging the columnar members 50*d* and 50*e* in accordance with the in-plane distribution of load applied to the lower jig plate 46, bending of the lower jig plate 46 is adjusted in accordance with the arrangement of the columnar members 50*d* and 50*e* so that load applied to each position of the lower jig plate 46 is balanced out, and a uniform load can be applied to the substrate 2 arranged on the lower jig plate 46 (the installation base 47).

Depending on the in-plane distribution of load applied to the lower jig plate 46, the columnar members 50 are appropriately installed to the installation portion 52 using at least one arrangement shown in FIGS. 4 and 7A. Note that, the columnar members 50 may be installed to the installation portion 52 in an arrangement other than the arrangements shown in FIGS. 4 and 7A.

Also, as described above, when the lower jig plate 46 is not supported by the support member 45, there is a problem, that is the closer it is to the center area of the lower jig plate 46, the larger the relative bending of the lower jig plate 46 becomes, and the closer it is to the outer periphery of the lower jig plate 46, the smaller the relative bending of the lower jig plate 46 becomes. The above-mentioned embodiments have solved such problem. When the lower jig plate 46 is not supported by the support member 45, there may be a case that the closer it is to the center area of the lower jig plate 46, the smaller the relative bending is, and the closer it is to the outer peripheral area of the lower jig plate 46, the larger the relative bending becomes. In this case, the in-plane distribution of the load applied to the lower jig plate 46 is roughly the opposite of the in-plane distribution of load shown in FIG. 5A, and load applied to the center area of the lower jig plate 46 becomes relatively large, while load applied to the outer peripheral area of the lower jig plate 46 becomes relatively small.

In such case, the material (Young's modulus), shape, arrangement, and so on of the columnar members 50 arranged on the installation portion 52 may be selected appropriately so that the columnar member 50 arranged closer to the center area of the lower jig plate 46 has a larger strain and the columnar member 50 arranged closer to the outer peripheral area of the lower jig plate 46 has a smaller strain. For example, for the columnar members 50 arranged closer to the center area of the lower jig plate 46, those with smaller Young's modulus or smaller diameter may be used; and for the columnar members 50 arranged closer to the outer peripheral area of the lower jig plate 46, those with larger Young's modulus or larger diameter may be used.

When the lower jig plate 46 is supported by the columnar members 50 having such strain characteristics, the lower jig plate 46 bends easily at a position closer to the center area, and load applied to the lower jig plate 46 can be reduced. As a result, load applied to the substrate 2 arranged on lower jig plate 46 (the installation base 47) at said position can be also reduced.

Also, at a position closer to the outer periphery of the lower jig plate 46, the lower jig plate 46 bends less, and load applied to the lower jig plate 46 can be increased. As a result, the load applied to the substrate 2 arranged on the lower jig plate 46 (the installation base 47) at said position can be increased.

As shown in FIG. 3A, the installation portion 52 is formed of a plate-shaped body having roughly a flat plate shape, and functions to support the columnar members 50 so that the columnar members 50 are held upright. The installation portion 52 has installation holes (not shown in the figures) for installing the columnar members 50. Lower ends of the columnar members 50 can be inserted into and fixed to the installation holes. The number of installation holes may be the same as the number of columnar members 50, or may be more than the number of columnar members 50. Each of the columnar members 50 may be fixed to the installation portion 52 (installation hole) using a joining member such as bolts, or may be fixed to the installation portion 52 (installation hole) using a connecting member such as adhesives.

Note that, the installation holes are not essential to the installation portion 52, and the columnar members 50 may be fixed using a joining member or a connecting member to the surface of the installation portion 52 having a planar shape (flat shape). Alternatively, the columnar members 50 may simply be in contact with the surface of the installation portion 52. Among the columnar members 50 shown in FIG. 4, the columnar member 50*a*1 positioned at the center may preferably be fixed to the installation portion 52 using a joining member, an adhesive member, or the like.

Also, the columnar member 50*a*1 may preferably be fixed to the lower face of the lower jig plate 46 using a joining member, an adhesive member, or the like. By fixing only the columnar member 50*a*1 among the columnar members 50 to the lower face of the lower jig plate 46, bending of the lower jig plate 46 can be adjusted to be small at the center area of the lower jig plate 46, and the load applied to the lower jig plate 46 can be made relatively large.

Figure 8A:
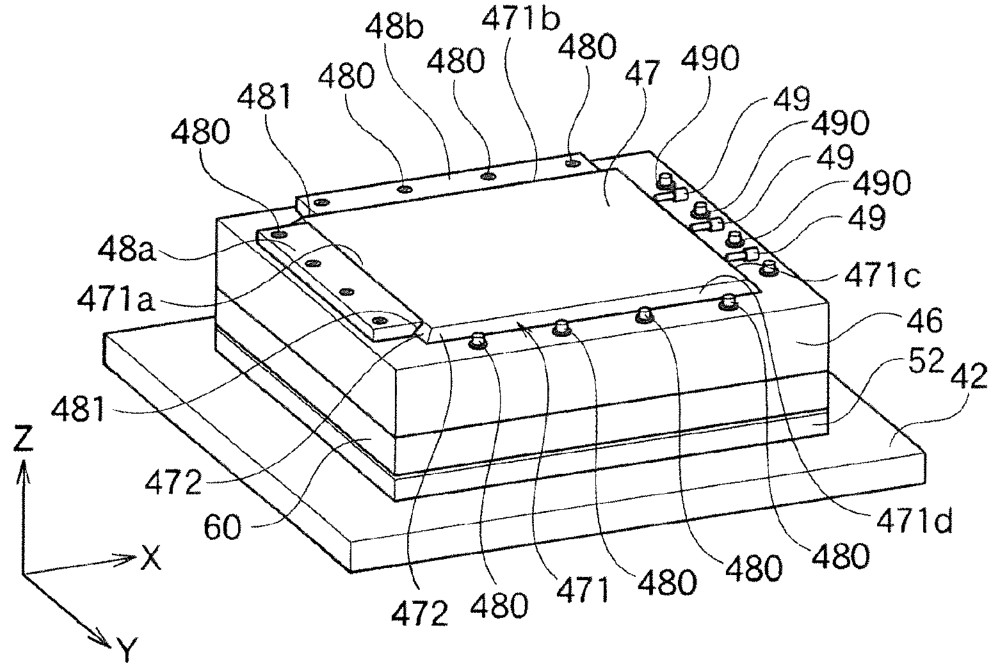
FIG. 8A is a perspective diagram showing the installation base arranged on the lower jig plate.
Figure 8B:
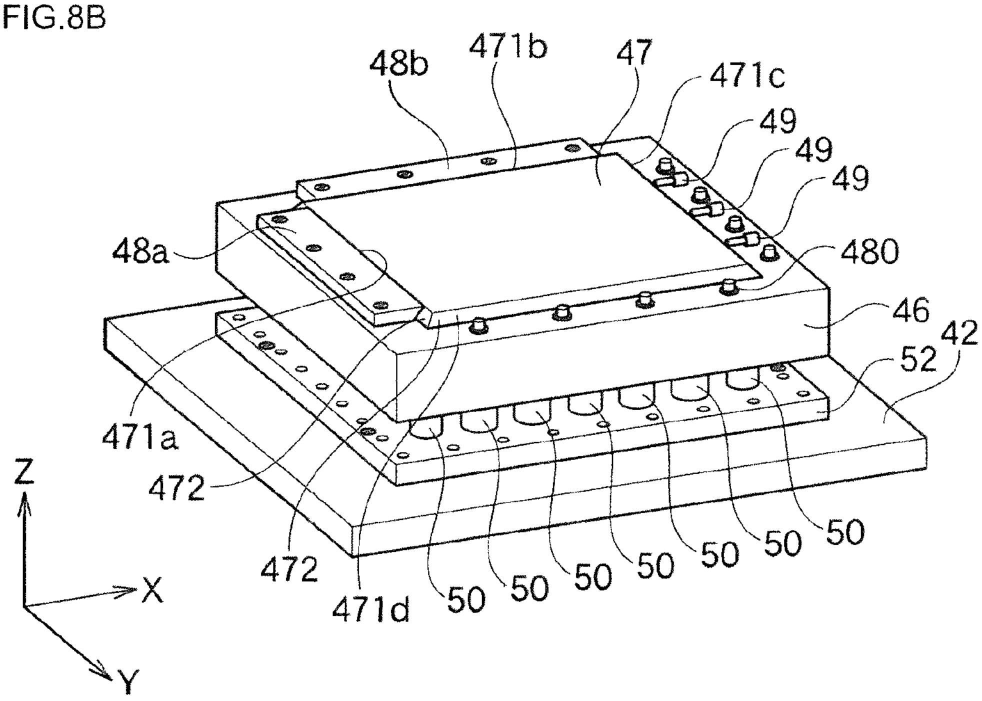
FIG. 8B is a perspective diagram showing a state when an insulation material is removed from the substrate pressurizing portion shown in FIG. 8A.

When pressure is applied to the substrate 2 through the upper jig plate 44 (FIG. 3A), the lower jig plate 46 and so on may undergo heat deformation due to heating of the upper jig plate 44 and the lower jig plate 46, hence it was difficult to apply uniform load to the substrate 2 by using the conventional technique. Thus, regarding the substrate processing apparatus 10 according to the present embodiment, in order to prevent such problem, the installation base 47 is provided on the upper face of the lower jig plate 46 as shown in FIGS. 8A and 8B. The installation base 47 is made of solid board which is roughly a flat plate shape, and the substrate 2 is arranged on the installation base 47. That is, in the present embodiment, the substrate 2 is not directly arranged on the upper face of the lower jig plate 46; and the installation base 47 is placed between the substrate 2 and the lower jig plate 46.

When the substrate 2 is pressurized through the upper jig plate 44 under such condition, even if the lower jig plate 47 is deformed (heat expanded) due to heating of the lower jig plate 46, it is unlikely to directly impact the substrate 2. Thus, uniform load can be applied through the upper jig plate 44 to the substrate 2 arranged on the installation base 47.

The lower face of the installation base 47 is firmly in contact with the upper face of the lower jig plate 46. At the edges 471 (side parts or side faces) of the installation base 47, a base slanted portion 472 is formed to each edge. Here, among the edges 471, an edge of the installation base 47 at X-axis negative direction side may be referred to as "edge 471*a*", an edge of the installation base 47 at Y-axis negative direction side may be referred to as "edge 471*b*", an edge of the installation base 47 at X-axis positive direction side may be referred to as "edge 471*c*", and an edge of the installation base 47 on Y-axis positive direction side may be referred to as "edge 471*d*". The edge 471*a* and the edge 471*c* are located at opposite side across X-axis direction, and the edge 471*b* and the edge 471*d* are located at opposite side across Y-axis direction.

The base slanted portion 472 is slanted in a way that it becomes thinner (i.e., the height of the slanted face of the base slanted portion 472 decreases) towards outside of the installation base 47 (towards the side away from the center of the installation base 47). That is, the installation base 47 as a whole has a protruding shape which protrude upwards.

The slant angle θ of the base slanted portion 472 may preferably be within a range of 0°<θ<90°, and more preferably within a range of 30 °<θ≥60°. By having the slant angle θ of the base slant portion 472 within such range, the edges 471 of the installation base 47 can have some degree of thickness, and the strength of the edges 471 can be reinforced.

Preferably areas of the upper face and the lower face of the installation base 47 may be smaller than the area of the upper face of the lower jig plate 46, and larger than the area of the upper face or the lower face of the substrate 2. A thickness T1 of the installation base 47 (FIG. 10A) is thinner than a thickness T2 (FIG. 10A) of the lower jig plate 46. A ratio of the thickness T1 to the thickness T2 represented by T1/T2 may preferably be within a range of 1/16 to 1, and more preferably within a range of 1/8 to 3/4. By having the ratio T1/T2 within such range, the installation base 47 attains a suitable thickness and the influence of deformation (heat expansion) of the lower jig plate 46 can be effectively prevented from affecting the substrate 2 arranged on the installation base 47.

The installation base 47 is made of ceramics or glass. As glass used for the installation base 47, glass materials such as Neoceram (registered trademark), quartz glass, and so on may be used. Also, as ceramics used for the installation base 47, ceramic materials such as silicon carbide, silicon nitride, aluminum nitride, aluminum oxide, and so on may be used. Also, other than the above-mentioned materials, various inorganic solid materials having lower heat expansion property than the lower jig plate 46 can be used.

As such, by using ceramics or glass having lower heat expansion property than metals (SUS, iron, nickel, and so on) configuring lower jig plate 46 as the material for making the installation base 47, even if heat of the lower jig plate 46 transfers to the lower jig plate 46 while the lower jig plate 46 is heated, deformation (heat expansion) of the installation base 47 can be prevented. Therefore, the influence of the deformation of the installation base 47 is prevented from affecting the substrate 2 arranged on the installation base 47, and uniform load can be applied to the substrate 2.

Also, regarding the point of the processing accuracy. the surface accuracy (for example, flatness, smoothness, and so on) can be obtained by using ceramics or glass compared to the metals configuring lower jig plate 46. Therefore, by configuring the installation base 47 using ceramics or glass, the installation base 47 can attain sufficient surface accuracy.

At the upper face of the lower jig plate 46, the temporary fixing frames 48*a* and 48*b* are provided which are in contact with part of the edges 471 of the installation base 47. The temporary fixing frame 48*a* is in contact with the edge 471*a*, and the temporary fixing frame 48*b* is in contact with the edge 471*b*. The temporary fixing frames 48*a* and 48*b* are respectively provided at positions corresponding to any two of the sides of the installation base 47 (in the example shown in the figure, the side corresponding to the edges 471*a* and 471*b*). The temporary fixing frames 48*a* and 48*b* are for arranging the installation base 47 to the lower jig plate 46 at the predetermined position, and for temporarily fixing the installation base 47 to the lower jig plate 46.

The temporary fixing frame 48*a* is made of a board of roughly a flat plate shape (roughly a rectangular parallelepiped shape), and it is arranged on the upper face of the lower jig plate 46 in a way that the longitudinal direction of the temporary fixing frame 48*a* matches the Y-axis direction. The thickness of the temporary fixing frame 48*a* is about the same as the thickness of the installation base 47, however it may be thicker or thinner than the installation base 47. The Y-axis direction width of the temporary fixing frame 48*a* may be about the same as the Y-axis direction width of the edge 471*a* of the installation base 47, or it may also be shorter than this. That is, the temporary fixing frame 48*a* may be in contact with the entire edge 471*a* of the installation base 47, or it may be in contact with part of the edge 471*a*.

In the example shown in the figures, one temporary fixing frame 48*a* is in contact with the edge 471*a*, however, the temporary fixing frames 48*a* may be respectively in contact with the edge 471*a* taking predetermined space between each other. A shape of the temporary fixing frame 48*a* is not particularly limited to the shape shown in the figures, and for example, it may be a cuboid shape and so on. The X-axis direction width of the temporary fixing frame 48*a* may differ depend on the space formed outside of the installation base 47 on the lower jig plate 46.

The temporary fixing frame 48*b* is made of a board of a flat-plate shape (roughly a rectangular parallelepiped shape), and it is arranged on the upper face of the lower jig plate 46 in a way that the longitudinal direction of the temporary fixing frame 48*b* matches X-axis direction. The thickness of the temporary fixing frame 48*b* is roughly the same as the thickness of the installation base 47, however, it may be thicker or thinner than the thickness of the installation base 47. The X-axis direction width of the temporary fixing frame 48*b* may be roughly the same as the X-axis direction width of the edge 471*b* of the installation base 47, or it may be shorter than this. That is, the temporary fixing frame 48*b* may be in contact with the entire edge 471*b* of the installation base 47, or it may be only in contact with part of the edge 471*b*.

In the example shown in the figures, one temporary fixing frame 48*b* is in contact with the edge 471*b*, however, the temporary fixing frames 48*b* may be respectively in contact with the edge 471*b* taking predetermined space between each other. A shape of the temporary fixing frame 48*b* is not particularly limited to the shape shown in the figures, and for example, it may be a cuboid shape and so on. The Y-axis direction width of the temporary fixing frame 48*b* may depend on the space formed outside of the installation base 47 on the lower jig plate 46.

The temporary fixing frames 48*a* and 48*b* are fixed to the lower jig plate 46 using fastening members 480. The fastening members 480 are arranged along the longitudinal direction of the temporary fixing frames 48*a* and 48*b*, and are arranged taking predetermined space between each other. The fastening member 480 penetrates through the through hole formed to the temporary fixing frames 48*a* and 48*b*, and it is embedded inside the depression formed to the lower jig plate 46 (see FIG. 10A). The fastening member 480 may be configured of various members such as, bolts, pins, and so on. Note that, a means for fixing the temporary fixing frames 48*a* and 48*b* to the lower jig plate 46 is not limited to the fastening member 480, and for example, the temporary fixing frames 48*a* and 48*b* may be fixed to the lower jig plate 46 using a bonding member such as adhesives and so on.

The temporary fixing frame 48*a* and the temporary fixing frame 48*b* are arranged so that these are roughly perpendicular to each other. At an intersection portion between the temporary fixing frame 48*a* and the temporary fixing frame 48*b* (at the position which is a corner of the installation base 47), the temporary fixing frame 48*a* and the temporary fixing frame 48*b* are not in contact, these are spaced apart by taking a predetermined space between each other.

At the inside of the temporary fixing frame 48*a* contacting the edge 471*a* of the installation base 47, an inner slanted portion 481 is formed which engages with the base slanted portion 472 formed to the edge 471*a*. Also, at the inside of the temporary fixing frame 48*b* contacting the edge 471*b* of the installation base 47, the inner slanted portion 481 is formed which engages with the base slanted portion 472 formed to the edge 471*b*. The inner slanted portion 481 is slanted in a way that it becomes thinner towards the direction closer to the installation base 47 (the height of the slanted face becomes higher). The slanted face of the inner slanted portion 481 is roughly parallel to the slanted face of the base slanted portion 472, and the inner slanted portion 481 and the base slanted portion 472 can engage with each other.

The slanted face of the inner slanted portion 481 is slanted upwards toward the direction close to the installation base 47, thus the position shifting of the installation base 47 to the upwards direction can be prevented when the inner slanted portion 481 and the base slanted portion 472 are engaged. Note that, the slanted face of the inner slanted portion 481 may be slanted downwards toward the installation base 47. In this case, the base slanted portion 472 is formed so that the slanted face of the base slanted portion 472 is slanted upwards toward the outside of the installation base 47.

On the lower jig plate 46, temporary fixing jigs 49 are provided. More specifically, the temporary fixing jigs 49 are provided at the position corresponding to the edge 471*c* of the installation base 47. The temporary fixing jigs 49, together with the temporary fixing frame 48*a*. are for setting the position and temporarily fixing the installation base 47 to the predetermined position of the lower jig plate 46. The temporary fixing jigs 49 are arranged at the opposite side to the temporary fixing frame 48*a* in X-axis direction; and when viewed from Y-axis direction, the installation base 47 is arranged between the temporary fixing frame 48*a* and the temporary fixing jigs 49.

The temporary fixing jigs 49 are arranged in Y-axis direction taking predetermined space in between each other. In the example shown in the figures, three temporary fixing jigs 49 are provided to the lower jig plate 46, but the number of the temporary fixing jigs 49 may be one, two, or four or more.

The temporary fixing jig 49 includes a movable member 490 so that it can move in X-axis direction. The temporary fixing jig 49 moves (stretch out) the movable member 490 towards installation base 47 which makes the movable member 490 to contact the edge 471*c* of the installation base 47, thereby the installation base 47 is temporarily fixed to the lower jig plate 46. Functions of the temporary fixing jig 49 is described in detail in below.

Figure 9:
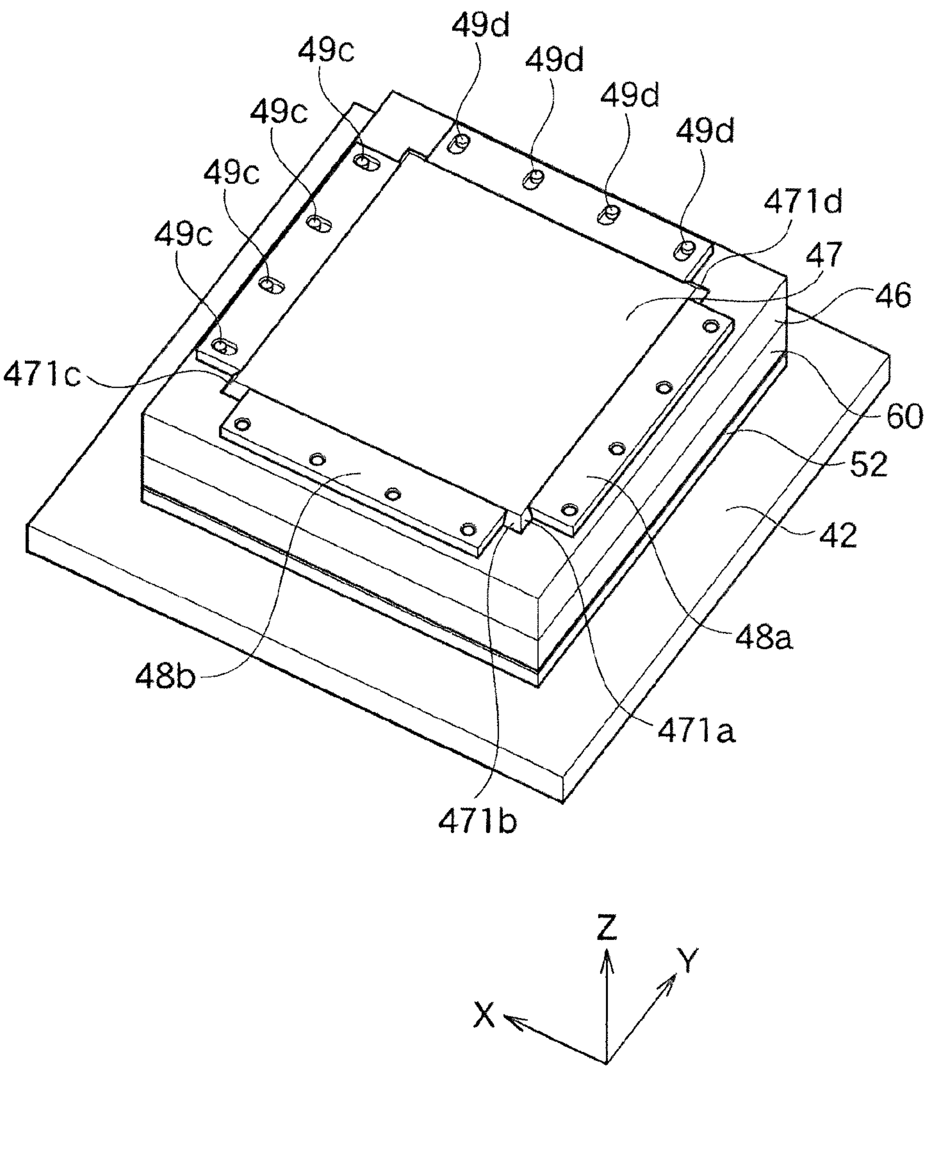
FIG. 9 is a perspective diagram showing a modification example of the substrate pressurizing portion shown in FIG. 8A.

As shown in FIG. 9, at the upper face of the lower jig plate 46, the temporary fixing frames 48*c* and 48*d* may be provided in addition to the temporary fixing frames 48*a* and 48*b*. The temporary fixing frame 48*c* is provided at the position corresponding to the edge 471*c* of the installation base 47, and the temporary fixing frame 48*d* is provided at the position corresponding to the edge 471*d* of the installation base 47.

The temporary fixing frame 48*c* is located at the opposite side to the temporary fixing frame 48*a* in X-axis direction; and when viewed from Y-axis direction, the installation base 47 is arranged between the temporary fixing frame 48*a* and the temporary fixing frame 48*c*. The temporary fixing frame 48*d* is located at the opposite side to the temporary fixing frame 48*b* in Y-axis direction; and when viewed from X-axis direction, the installation base 47 is arranged between the temporary fixing frame 48*b* and the temporary fixing frame 48*d*. The temporary fixing frames 48*a* to 48*d* are arranged roughly in a ring form, and the installation base 47 is arranged so that it is surrounded by the temporary fixing frames 48*a* to 48*d* and it is located at inner side than these.

Figure 10A:
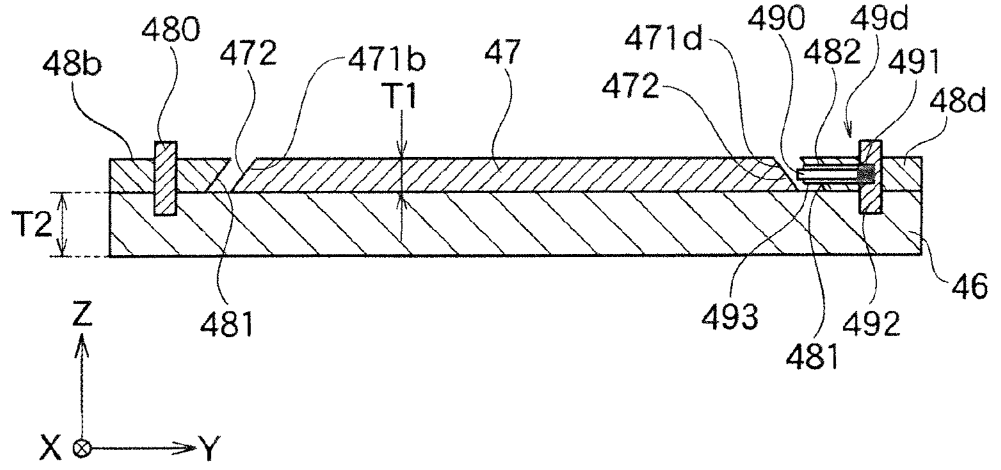
FIG. 10A is a diagram showing a movement of the temporary fixing jig shown in FIG. 9.

The space between the temporary fixing frame 48*a* and the temporary fixing frame 48*c* is larger than the X-axis direction width of the installation base 47, and the space between the temporary fixing frame 48*b* and the temporary fixing frame 48*d* is larger than the Y-axis direction width of the installation base 47 (see FIG. 10A). Details are described in below, and the edge 471 of the installation base 47 contacts with the temporary fixing frames 48*a* and 48*b* among the temporary fixing frames 48*a* to 48*d*, and does not contact with the temporary fixing frames 48*c* and 48*d*.

On the upper face of the lower jig plate 46, at the position where the temporary fixing frame 48*c* is arranged, a plurality (four) of temporary fixing jigs 49*c* is provided, and at the position where the temporary fixing frame 48*d* is arranged, the plurality (four) of temporary fixing jigs 49*d* is provided. These temporary fixing jigs 49*c* and 49*d* are arranged inside of the plurality of through holes formed to the temporary fixing frames 48*c* and 48*d*.

The temporary fixing jig 49*c* arranged to the temporary fixing frame 48*c* holds the movable member 490 so that it can move back and forth in X-axis direction. The temporary fixing jig 49*d* arranged to the temporary fixing frame 48*d* holds the movable member 490 so that it can move back and forth in Y-axis direction. In below, the detailed structure of the temporary fixing jig 49*d* is described using FIG. 10A and FIG. 10B. Note that, the configuration of the temporary fixing jig 49*c* is the same as the configuration of the temporary fixing jig 49*d*, thus the detailed description is omitted.

Figure 10B:
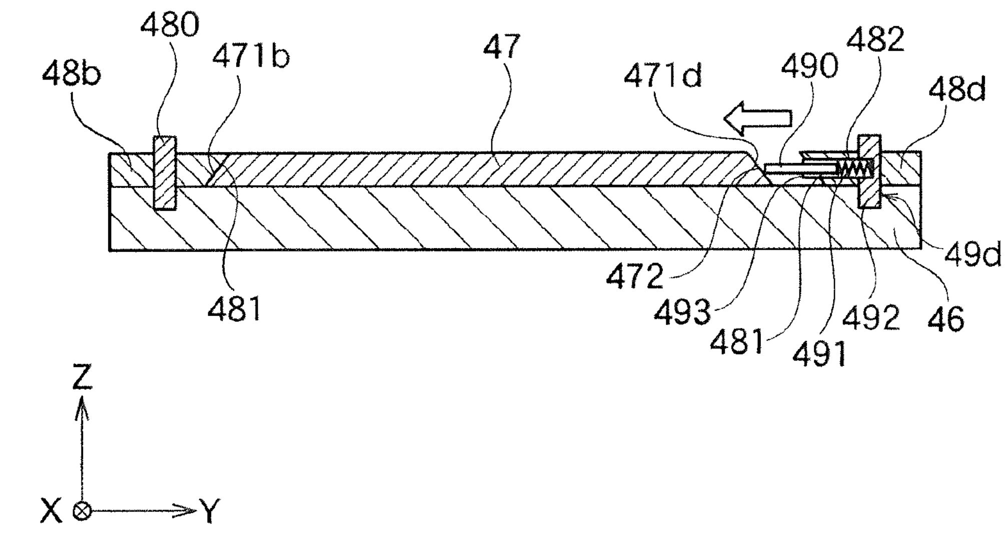
FIG. 10B is a diagram showing subsequent movement of the temporary fixing jig shown in FIG. 10A.

As shown in FIG. 10A and FIG. 10B, the temporary fixing jig 49*d* is, for example, made of a plunger, and the temporary fixing jig 49*d* includes the movable member 490, a resilient body 491, an axis member 492, and a case body 493. The case body 493 is a cylinder shape with bottom, and accommodates the movable member 490 and the resilient body 491. The case body 493 is provided (accommodated) in a jig installation hole 482 formed to the temporary fixing jig 48*d*. The jig installation hole 482 is an elongated hole which is depressed toward outside from the inside of the temporary fixing frame 48*d* (the side where the installation base 47 is arranged). One end of the case body 493 is embedded in the depression formed to the axis member 492, and the case body 493 is fixed while being perpendicular to the axis member 492.

The movable member 490 is for example made of a rod shape member, and is housed in the case body 493. The longitudinal direction of the movable member 490 matches the moving direction of the movable member 490. The shape of the movable member 490 is not particularly limited to the shape shown in the figures, and it does not necessarily have to be a longitudinal shape. For example, the shape of the movable member 490 may be a cuboid shape or so. The movable member 490 is configured so that the edge 471*d* of the installation base 47 can be pressed using the tip of the movable member 490.

The axis member 492 is made of, for example, a rod shape member, and it is provided in upright against the lower jig plate 46. The axis member 492 supports the case body 493 such that it is fixed parallel to Y-axis direction. The lower end of the axis member 492 is embedded in the depression formed to the lower jig plate 46, and fixed to the lower jig plate 46. Note that, the fixation of the axis member 492 is not limited to this embodiment, and it may be fixed to the upper face of the lower jig plate 46 using a connecting member such as adhesives and so on.

The resilient body 491 is made of a resilient member which can deform resiliently, and for example, it may be made of spring, rubber, and so on. The resilient body 491 provides resilient force (impelling force) to the movable member 490, and the movable member 490 moves in Y-axis positive direction and Y-axis negative direction using said resilient force. One end of the resilient body 491 is connected to the inner face (bottom portion) of the case body 493, and the other end of the resilient body 491 is connected to one end of the movable member 490.

When the installation base 47 is being arranged between the temporary fixing frame 48*b* (or the temporary fixing frame 48*a*) and the temporary fixing frame 48*d* (or the temporary fixing frame 48*c*), the resilient body 491 holds the movable member 490 while the resilient body 491 is being biased, and resilient force is stored to the resilient body 491. Also, when the installation base 47 is being arranged between the temporary fixing frame 48*b* (or the temporary fixing frame 48*a*) and the temporary fixing frame 48*d* (or the temporary fixing frame 48*c*), space is formed between the edge 471*b* of the installation base 47 and the temporary fixing frame 48*b*, and these are not in contact. Also, space is formed between the edge 471*d* of the installation base 47 and the temporary fixing frame 48*d*.

While under such condition, when the temporary fixing jig 49*d* releases the resilient force (biasing force) stored in the resilient body 491, as shown in FIG. 10B, the resilient body 491 stretches and due to the resilient force from the resilient body 491, and the movable member 490 is pushed towards the installation base 47 in Y-axis direction from the position where the movable member 490 is biased by the resilient body 491 (the position shown in FIG. 10A).

As a result, the tip of the movable member 490 contacts the edge 471*d* (the base slanted portion 472) of the installation base 47, and the edge 471*d* is pushed towards the side where the temporary fixing jig 48*b* is arranged. The installation base 47 which is pushed by the movable member 490 moves towards the temporary fixing frame 48*b* until the edge 471*b* of the installation base 47 contacts the temporary fixing frame 48*b*. The edge 471*b* of the installation base 47 contacts the temporary fixing frame 48*b*, and the inner slanted portion 481 of the temporary fixing frame 48*b* engages with the base slanted portion 472 of the installation base 47, thereby the installation base 47 is temporarily fixed at the edge 471*b* side to the lower jig plate 46 by the temporary fixing frame 48*b*.

Also, while under this condition, the tip of the movable member 490 is pressing the edge 471*d* of the installation base 47 with an appropriate force, the installation base 47 is temporarily fixed at the edge 471*d* side to the lower jig plate 46 by the temporary fixing jig 49*d*. As a result, the installation base 47 is held between the temporary fixing frame 48*b* and the movable member 490, and thus shifting of the installation base 47 from a predetermined position can be prevented by the temporary fixing frame 48*b* and the movable member 490. Note that, the edge 471*d* of the installation base 47 does not contact the temporary fixing frame 48*d*, thus even when the installation base 47 is temporarily fixed to the lower jig plate 46, there is a space formed between the edge 471*d* of the installation base 47 and the temporary fixing frame 48*d*.

When the lower jig plate 46 is heated while the installation base 47 is temporarily fixed to the lower jig plate 46 as described in above, heat transfers to the installation base 47, and the installation base 47 heat expands to some extent, which could cause the installation base 47 to expand in a plane direction (that is, in X-axis direction and Y-axis direction). In the present embodiment, the temporary fixing jig 49*d* is not permanently fixed (completely fixed) and it is only temporarily fixed, thus for example, in the case that installation base 47 expands in Y-axis direction, the movable member 490 is pushed back towards the temporary fixing jig 49*d* from the installation base 47 due to stress from the installation base 47. Note that, permanently fixed (completely fixed) means that the installation base 47 is firmly fixed to the lower jig plate 46 using a fastening member and so on so that it cannot move.

That is, when the installation base 47 expands in the plane direction towards the side where the temporary fixing jig 49*d* is arranged, due to stress generated during the expansion, the movable member 490 is pushed back toward the side where the temporary fixing jig 49*d* is arranged along the direction of deformation of the installation base 47. Then, the movable member 490 is stopped at the position where the stress of expansion of the installation base 47 and the resilient force of the resilient body 491 are balanced, and at this condition, the installation base 47 is temporarily fixed to the lower jig plate 46. Note that, subsequently, when the installation base 47 shrinks, the installation base 47 again moves toward the side where the temporary fixing frame 48*b* is arranged by being pushed by the movable member 490. Then, the installation base 47 is temporarily fixed to the lower jig plate 46 at the position where the resilient force from the resilient body 491 and the stress generated by the installation base 47 are balanced.

As such, in the present embodiment, the installation base 47 is temporarily fixed to the lower jig plate 46 in a deformable manner (so that the deformation of the installation base 47 can be absorbed by the temporary fixing jig 49). Therefore, by freely deforming the installation base 47 in the plane direction on the lower jig plate 47 without limiting the deformation of the installation base 47, stress generated by the deformation of the installation base 47 can be effectively released. Also, since the installation base 47 can deform (expand) freely in X-axis direction and Y-axis direction, the deformation in Z-axis direction is reduced relatively. Hence, the surface accuracy (flatness, smoothness, and so on) of the upper face of the installation base 47 can be prevented from being damaged, and uniform load can be applied by the upper jig plate 44 to substrate 2 which is arranged on the upper face of the installation base 47.

Hereinabove, the configuration and the movement of the temporary fixing jig 49*d* has been described using FIG. 10A and FIG. 10B, the same applies to the temporary fixing jig 49*c*. That is, in the present embodiment, as shown in FIG. 9, using the temporary fixing frame 48*a* and the temporary fixing jigs 49*c* which are located at the opposite position to the temporary fixing frame 48*a* in X-axis direction, the installation base 47 is temporarily fixed to the lower jig plate 46 in a movable manner in accordance with the deformation (heat expansion) of the installation base 47 in X-axis direction. Also, regarding Y-axis direction, using the temporary fixing frame 48*b* and the temporary fixing jigs 49*d* which are positioned at the opposite side in Y-axis direction, the installation base 47 is temporarily fixed to the lower jig plate 46 in a movable manner in accordance with the deformation of the installation base 47 in Y-axis direction.

Note that, as shown in FIG. 8A, the installation base 47 may be temporarily fixed to the lower jig plate 46 only in X-axis direction using the temporary fixing frame 48*a* and the temporary fixing jigs 49. In this case, regarding Y-axis direction, the installation base 47 may be temporarily fixed to the lower jig plate 46 using the temporary fixing frame 48*b* and the fastening members 480 located at the opposite position to the temporary fixing frame 48*b* in Y-axis direction.

Figure 11:
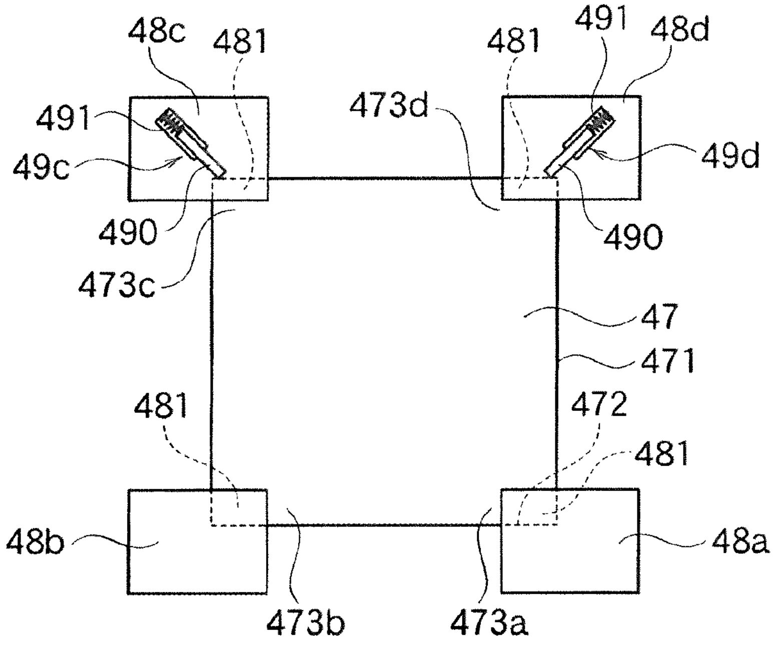
FIG. 11 is a diagram showing another modification example of the arrangement of the temporary fixing frame and the temporary fixing jig shown in FIG. 9.

Note that, the arrangement of the temporary fixing frames 48*a* to 48*d* is not limited to those shown in FIG. 8A and FIG. 9, and it may be modified accordingly. For example, as shown in FIG. 11, in the case that the installation base 47 is roughly a rectangular shape, the temporary fixing frame 48*a* may be provided at the position corresponding to a first corner 473*a* of the installation base 47, and the temporary fixing jig 49*c* may be provided at the position corresponding to a third corner 473*c* positioned roughly diagonally opposite to the first corner 473*a*. Also, the temporary fixing frame 48*b* may be provided at the position corresponding to a second corner 473*b* of the installation base 47, and the temporary fixing jig 49*d* may be provided to the position corresponding to a fourth corner 473*d* positioned roughly diagonally opposite to the second corner 473*b*.

In the example shown in the figures, the temporary fixing frame 48*c* is provided at the third corner 473*c* where the temporary fixing jig 49*c* is arranged, and the temporary fixing frame 48*d* is provided at the fourth corner 473*d* where the temporary fixing jig 49*d* is arranged.

At each corner of the temporary fixing frames 48*a* to 48*d* facing the corners 473*a* to 473*d* of the installation base 47, the inner slanted portion 481 is formed. At the position of each inner slanted portion 481, the first corner 473*a* to the fourth corner 473*d* of the installation portion 47 are arranged respectively.

Regarding the temporary fixing jig 49*c*, the movable member 490 is in contact with the edge 471 at the position of the third corner 473*c* of the installation base 47, and the edge 471 is pushed towards the center of the installation base 47. Therefore, the installation base 47 diagonally moves towards the temporary fixing frame 48*a*, and the base slanted portion 472 formed to the first corner 473*a* of the installation base 47 contacts the inner slanted portion 481 of the temporary fixing frame 48*a*. Thereby, the base slanted portion 472 engages with the inner slanted portion 481.

Also, regarding the temporary fixing jig 49*d*, the movable member 490 contacts the edge 471 at the position of the fourth corner 473*d* of the installation base 47, and the edge 471 is pushed towards the center of the installation base 47. Therefore, the installation base 47 diagonally moves towards the temporary fixing frame 48*b*, and the base slanted portion 472 formed to the second corner 473*b* of the installation base 47 contacts the inner slated portion 481 of the temporary fixing frame 48*b*. Thereby, the base slanted portion 472 engages with the inner slanted portion 481.

As a result, the installation base 47 is temporary fixed to the lower jig plate 46 such that the installation base 47 is held between the temporary fixing frame 48*a* and the temporary fixing jig 49*c* arranged on diagonally opposite side to the temporary fixing frame 48*a*, and also the installation base 47 is temporarily fixed to the lower jig plate 46 such that the installation base 47 is held between the temporary fixing frame 48*b* and the temporary fixing jig 49*b* arranged on diagonally opposite side to the temporary fixing frame 48*b*. Note that, in the example shown in the figures, the temporary fixing frame 48*a* (or the temporary fixing frame 48*b*) and the temporary fixing jig 49*c* (or the temporary fixing jig 49*d*) positioned on diagonally opposite side to the temporary fixing frame 48*a* (or the temporary fixing frame 48*b*) may be omitted, and the installation base 47 may be temporary fixed to the lower jig plate 46 by only using the temporarily fixing frame 48*b* (or the temporary fixing frame 48*a*) and the temporary fixing jig 49*d* (or the temporary fixing jig 49*c*) positioned on diagonally opposite side to the temporary fixing frame 48*b* (or the temporary fixing frame 48*a*).

Figure 12:
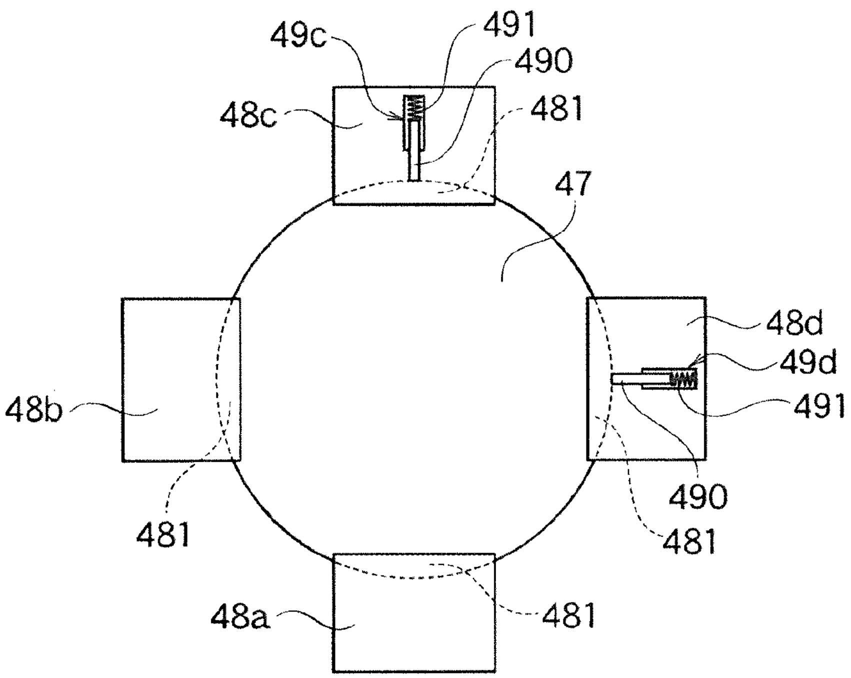
FIG. 12 is a diagram showing another modification example of the arrangement of the temporary fixing frame and the temporary fixing jig shown in FIG. 9.

Also, as shown in FIG. 12, when the installation base 47 is roughly a circular shape, the temporary fixing frame 48*a* is provided to an arbitrary position of the outer periphery of the installation base 47, and the temporary fixing jig 49*c* may be provided at the position which is the opposite side to the temporary fixing frame 48*a* in the radial direction of the installation base 47 (that is. the position which is point symmetric to the temporary fixing frame 48*a*). Also, the temporary fixing frame 48*b* may be provided to the position which is rotated for 90-degree angle from the temporary fixing frame 48*a* in clockwise direction along the circumference direction, and the temporary fixing jig 49*d* may be provided at the position which is at the opposite side to the temporary fixing frame 48*b* in the radial direction of the installation base 47. When such configuration is taken, the installation base 47 can be temporarily fixed to the lower jig plate 46 such that the outer periphery of the installation base 47 is held between the temporary fixing frames 48*a* and 48*b* and the temporary fixing jigs 49*c* and 49*d*.

Figure 13:
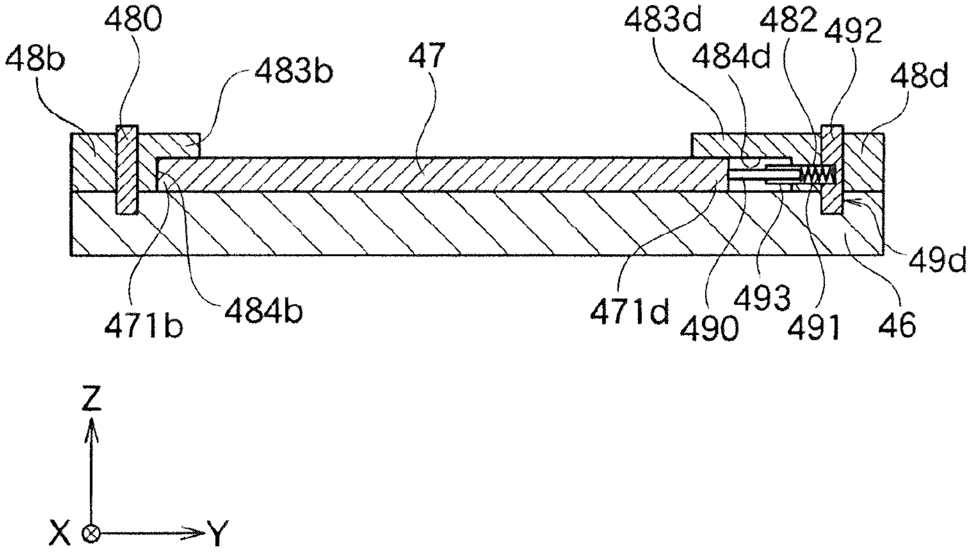
FIG. 13 is a diagram showing another modification example of the temporary fixing frame and the temporary fixing jig shown in FIG. 9.

In the example shown in FIG. 10A and FIG. 10B, the inner slanted portion 481 of the temporary fixing frame 48*b* engages with the base slanted portion 472 formed to the edge 471*b* of the installation base 47, and also the base slanted portion 472 formed to the edge 471*d* of the installation base 47 contacts the movable member 490 of the temporary fixing jig 49*d*, thereby the installation base 47 is temporarily fixed to the lower jig plate 46. However, the temporary fixation of the installation base 47 to the lower jig plate 46 is not necessarily limited to this. For example, as shown in FIG. 13, a hook 483*b* may be formed to the inside of the temporary fixing frame 48*b*, and also a hook 483*d* may be formed to the inside of the temporary fixing frame 48*d*, then the edge 471*b* of the installation base 47 may engage with the hook 483*b* and the edge 471*b* of the installation base 47 may engage with the hook 483*d*. Thereby, the installation base 47 may be temporarily fixed to the lower jig plate 46. The hooks 483*b* and 483*d* protrude to the inside than the edge 471 of the installation base 47, and these protruded portions function as a stopper against the upward position shifting of the installation base 47.

In this embodiment, a base housing portion 484*b* formed at the position of the hook 483*b* accommodates the edge 471*b* of the installation base 47, and a base housing portion 484*d* formed to the position of the hook 483*d* accommodates the edge 471*d* of the installation base 47. Thereby, the hooks 483*b* and 483*d* are restricted from moving up of the installation base 47, and the temporary fixation of the installation base 47 to the lower jig plate 46 can be prevented from being released. Such configuration can also be applied to the temporary fixing frame 48*a* and the temporary fixing frame 48*c* shown in FIG. 9.

As shown in FIG. 8A, an insulation material 60 are arranged between the lower jig plate 46 and the installation portion 52. The insulation material 60 is roughly a flat-plate shape, and accommodation holes (not shown in the figure) for accommodating the columnar member 50 are formed to the insulation material 60. The accommodation holes accommodate the columnar member 50, and the columnar members 50 are covered with the insulation material 60. By placing the insulation material 60 between the lower jig plate 46 and the installation portion 52, this prevents the temperature difference from occurring between the lower jig plate 46 and each position in the in-plane direction of the installation base 47 arranged on the lower jig plate 46.

That is, as shown in FIG. 4, when the columnar member 50*a* with large cross-sectional area is arranged at the center area of the lower jig plate 46 and the columnar members 50*b* and 50*c* with small cross-sectional areas are arranged at the outer periphery portion of the lower jig plate 46, the columnar member 50*a* with large cross-sectional area tends to have a higher thermal conductivity (heat dissipating property) compared to the columnar members 50*b* and 50*c* with small cross-sectional areas, hence the center area of the lower jig plate 46 releases heat more compared to the outer periphery portion of the lower jig plate 46. Thus, the closer it is to the center area of the lower jig plate 46, the easier it is for temperature to decrease, which causes the temperature difference to occur between the center area and the outer periphery portion of the lower jig plate 46, and also causes non-uniform temperature distribution in the lower jig plate 46 and the installation base 47 arranged on the lower jig plate 46.

Therefore, in the present embodiment, as shown in FIG. 8A, the insulation material 80 is arranged under the lower jig plate 46 to suppress heat dissipation particularly at the center area of the lower jig plate 46, thereby the temperature distribution in the lower jig plate 46 and the installation base 47 arranged on the lower jig plate 46 is adjusted to be uniform.

Note that, by constituting the columnar members 50 (particularly the columnar member 50*a* arranged at the center area of the lower jig plate 46) using a member with heat resistant property, heat dissipation of the columnar members 50 may be suppressed.

Hereinabove, in the substrate processing apparatus 10 according to the present embodiment, as shown in FIG. 8A, the installation base 47 is temporarily fixed to the lower jig plate 46 in a deformable manner in the plane direction. Therefore, even if the installation base is deformed (heat expanded) as heat of the lower jig plate 46 transfers to the installation base 47 while the lower jig plate 46 is heated, the installation base 47 can freely deform in the plane direction while on the lower jig plate 46 without limiting the deformation of the installation base 47 in the plane direction. Thereby, stress generated from the deformation of the installation base 47 can be released. Therefore, a sufficient surface accuracy (for example, flatness, smoothness, and so on) of the upper face of the installation base 47 can be secured, and the deformation of the installation base 47 can be prevented from influencing the substrate 2 arranged on the installation base 47, thus uniform load can be applied to the substrate 2.

Also, in the present embodiment, on the lower jig plate 46, the temporary fixing frames 48*a* and 48*b* which are in contact with part of the edge 471 of the installation base 47 are provided. By contacting the edges 471*a* and 471*b* of the installation base to the temporary fixing frames 48*a* and 48*b*, the installation base 47 can be temporarily fixed to the lower jig plate 46. By making the edges 471*c* and 471*d* of the installation base 47 in free state without contacting to the temporary fixing frame, even when the installation base 47 is deformed due to heating of the lower jig plate 46, the installation base 47 can freely deform in the plane direction while on the lower jig plate 46 without limiting the deformation of the installation base 47. Thereby. stress generated from the deformation of the installation base 47 can be released. Also, by temporarily fixing the installation base 47 to the lower jig plate 46 using the temporary fixing frames 48*a* and 48*b*, the position of the installation base 47 can be easily determined.

Also, by providing the temporary fixing frames 48*a* and 48*b* to the positions corresponding to the edges 471*a* and 471*b* of the installation base 47, when the installation base 47 is temporarily fixed to the lower jig plate 46, the position of the installation base 47 can be determined with high precision, and also the position shifting of the installation base 47 can be prevented effectively.

Also, in the present embodiment, the base slanted portion 472 is provided at the edges 471*a* and 471*b* of the installation base 47; and at the inner side of the temporary fixing frames 48*a* and 48*b* where the edges 471*a* and 471*b* come into contact, the inner slanted portion 481 which engages with the base slanted portion 472 is formed. By engaging the base slanted portion 472 and the inner slanted portion 481, the position shifting of the installation base 47 can be prevented, and also the installation base 47 can be effectively prevented from being released of the lower jig plate 46.

Also, in the present embodiment, as shown in FIG. 9, at the position corresponding to the edges 471*a* and 471*b* of the installation base 47, by engaging the edges 471*a* and 471*b* with the temporary fixing frames 48*a* and 48*b*, the installation base 47 is temporarily fixed to the lower jig plate 46. Also, at the position corresponding to the edges 471*c* and 471*d* of the installation base, the edges 471*c* and 471*d* are in contact with the temporary fixing jigs 49*c* and 49*d* (movable member 490), thereby the installation base 47 is temporarily fixed to the lower jig plate 46. Thereby, the edges 471*a* to 471*d* of the installation base 47 are held between the temporary fixing frames 48*a* and 48*b* and the temporary fixing jigs 49*c* and 49*d*, and the installation base 47 can be temporarily fixed to the lower jig plate 46. As such, by temporarily fixing the installation base 47 to the lower jig plate 46 using the temporary fixing frames 48*a* and 48*b* and the temporary fixing jigs 49*c* and 49*d*, the temporary fixation of the installation base 47 using either one of the temporary fixing frames 48*a* and 48*b* or the temporary fixing jigs 49*c* and 49*d* can be reinforced by the other one.

Note that, the present disclosure is not limited to the above-described embodiments, and various modifications can be made within the scope of the present disclosure.

In the above embodiments, all of the columnar members 50 have a circular columnar shape. However, one of the columnar members 50 may be a circular columnar shape, and other columnar members may be a polygonal columnar shape. a conical shape, a polygonal pyramid shape, or the like. The columnar members 50 having such shapes have different strain amounts when a certain load is applied. Therefore, also in this case, as similar to the above embodiments, the support member 45 can adjust the in-plane distribution of the load applied to the lower jig plate 46 and adjust bending generated to the lower jig plate 46 by the stain amount differences based on the difference in the shapes of the columnar members 50.

In the above embodiment, the support member 45 may provide a support force to the lower jig plate 46 in accordance with the distribution of height of the substrate 2 on which the elements 4*a*, 4*b*, and 4*c* are arranged. The non-uniformity of the load applied to the substrate 2 may be caused by the distribution of height of the substrate 2. The distribution of height of the substrate 2 may be caused by differences in shapes or sizes of the elements 4*a*, 4*b*, and 4*c*, asymmetrical arrangement of the elements 4*a*, 4*b*, and 4*c* with respect to the substrate 2, deformation of the elements 4*a*, 4*b*, and 4*c* during pressurization, or the like. For example, if no measures are taken, a relatively small load may be applied at a position where the height of the substrate 2 is relatively low, and a relatively large load may be applied at a position where the height of the substrate 2 is relatively high (the opposite pattern may also occur).

Even in such case, at a position where the height of the substrate 2 is relatively low, by arranging columnar members which do not strain easily, a relatively large supporting force is provided by the supporting member 45 (the columnar members 50) to the lower jig plate 46 so that the load applied to the lower jig plate 46 increases. Also, at a position where the height of the substrate 2 is relatively high, by arranging columnar members 50 which easily strain, a relatively small supporting force is provided by the supporting member 45 (the columnar members 50) to the lower jig plate 46 so that the load applied to the lower jig plate 46 decreases, thereby the load applied to each position of the lower jig plate 46 can be balanced out and a uniform load can be applied to the substrate 2.

Figure 2:
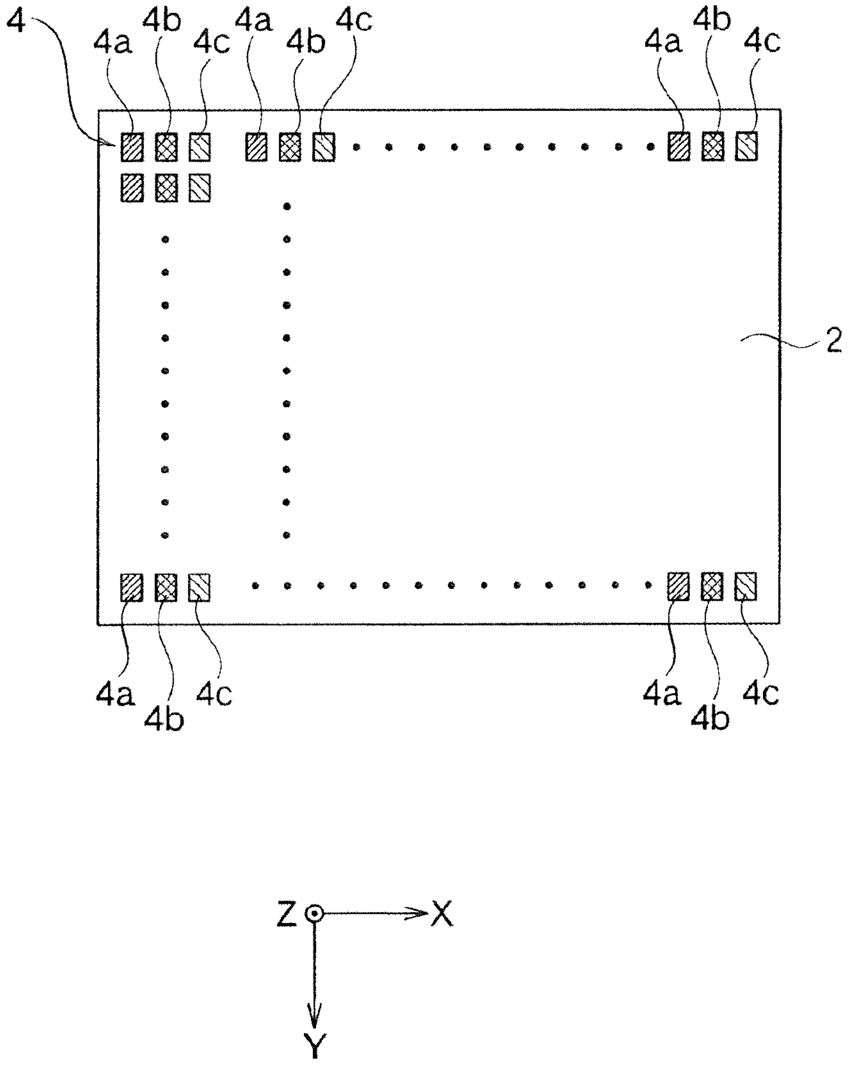
FIG. 2 is a diagram showing a substrate which is an object to be pressurized of the substrate processing apparatus shown in FIG. 1A.

In the above embodiments, as shown in FIG. 2, the shape of the substrate 2 is a quadrangular shape, but it may be circular or other polygonal shapes.

In the above-mentioned embodiments, the numbers of the temporary fixing frames 48*a* and so on provided to the lower jig plate 46 is not limited to the numbers of the temporary fixing frames shown in FIGS. 8A, 9, 11, and 12; and it may be changed accordingly. Also, the same applies to the number of the temporary fixing jigs 49 and so on provided to the lower jig plate 46. Also, the temporary fixing frames 48*a* and 48*b* and the temporary fixing jigs 49*c* and 49*d* do not necessarily have to be installed in pairs, and either one may be omitted. For example, the installation base 47 may be temporarily fixed to the lower jig plate 46 so that the edge 471*a* (or the edge 471*b*) and the edge 471*c* (or the edge 471*d*) of the installation base 47 holds a pair of the temporary fixing jigs 49*c*.

DESCRIPTION OF THE REFERENCE NUMERICAL

2 . . . Substrate
4 . . . Element Array
4*a*, 4*b*, 4*c* . . . Elements
6 . . . Pressure sensitive paper
10 . . . Substrate processing apparatus
20 . . . Pedestal
21 . . . Pedestal upper portion
22 . . . Movable Pressurizing portion
220 . . . Through hole
221 . . . Center area
23 . . . Pedestal lower portion
24 . . . Guide Bush
25 . . . Guide shaft
30 . . . Load Generating portion
40 . . . Substrate Pressurizing portion
41 . . . Upper stage
42 . . . Lower stage
43 . . . Upper mounting portion
44 . . . Upper jig plate
45 . . . Support member
46 . . . Lower jig plate
460 . . . Central area
461 . . . Side area
47 . . . Installation bae
471, 471*a* to 471*d* . . . Edge
472 . . . Base slanted portion
473*a* to 473*d* . . . Corner
48*a* to 48*d* . . . Temporary fixing frame
480 . . . Fastening member
481 . . . Inner slanted portion
482 . . . Jig installation hole
483*b*, 483*d* . . . Hook
484*b*, 484*d* . . . Base housing portion
49, 49*c*, 49*d* . . . Temporary fixing jig
490 . . . Movable member
491 . . . Resilient body
492 . . . Axis member
493 . . . Case body
50, 50*a* to 50 . . . Columnar member
500 . . . Collective body
52 . . . Installation portion
520 . . . Center area
60 . . . Insulation material

What is claimed is:

1. A substrate processing apparatus for applying pressure on
an object to be pressurized through an upper jig plate comprising a lower jig plate under the upper jig plate,
an installation base on the lower jig plate, and
a temporary fixing jig on the lower jig plate, wherein
the object is placed on the installation base,
the installation base is temporarily fixed to the lower jig plate so that deformation of the installation base can be absorbed by the temporary fixing jig, and
the temporary fixing jig comprises a movable member pushing an edge of the installation base and a resilient body holding the movable member in a movable manner.

2. A substrate processing apparatus for applying pressure on
an object to be pressurized through an upper jig plate comprising a lower jig plate under the upper jig plate,
an installation base on the lower jig plate, and
a temporary fixing jig on the lower jig plate, wherein
the object is placed on the installation base,
the installation base is made of ceramics or glass, and
the temporary fixing jig comprises a movable member pushing an edge of the installation
base and a resilient body holding the movable member in a movable manner.

3. The substrate processing apparatus according to claim 1
further comprising a temporary fixing frame on the lower jig plate and contacting
a part of the edge of the installation base, wherein
the temporary fixing frame and the temporary fixing jig hold the installation base therebetween.

4. The substrate processing apparatus according to claim 2
further comprising a temporary fixing frame on the lower jig plate and contacting
a part of the edge of the installation base, wherein
the temporary fixing frame and the temporary fixing jig hold the installation base therebetween.

5. The substrate processing apparatus according to claim 3,
wherein
the temporary fixing frame comprises temporary fixing frames, and
the temporary fixing frames are at positions corresponding to one or more sides of the installation base.

6. The substrate processing apparatus according to claim 4,
wherein
the temporary fixing frame comprises temporary fixing frames, and
the temporary fixing frames are at positions corresponding to one or more sides of the installation base.

7. The substrate processing apparatus according to claim 3, wherein the installation base comprises a base slanted portion at the edge of the installation base, and the temporary fixing frame comprises an inner slanted portion engaging the base slanted portion at an inner side of the temporary fixing frame where the edge of the installation base and the temporary fixing frame come into contact.

8. The substrate processing apparatus according to claim 4, wherein the installation base comprises a base slanted portion at the edge of the installation base, and the temporary fixing frame comprises an inner slanted portion engaging the base slanted portion at an inner side of the temporary fixing frame where the edge of the installation base and the temporary fixing frame come into contact.

9. The substrate processing apparatus according to claim 1, wherein the movable member is pushed towards the installation base from the temporary fixing jig due to a resilient force received from the resilient body, and the movable member is pushed back towards the temporary fixing jig from the installation base due to a stress received from the installation base.

10. The substrate processing apparatus according to claim 2, wherein the movable member is pushed towards the installation base from the temporary fixing jig due to a resilient force received from the resilient body, and the movable member is pushed back towards the temporary fixing jig from the installation base due to a stress received from the installation base.

11. The substrate processing apparatus according to claim 3, wherein the installation base is roughly a rectangular shape, the temporary fixing frame is at a position corresponding to a first side face of the installation base, and the temporary fixing jig is at a position corresponding to a second side face which is at an opposite side of the first side face of the installation base.

12. The substrate processing apparatus according to claim 4, wherein the installation base is roughly a rectangular shape, the temporary fixing frame is at a position corresponding to a first side face of the installation base, and the temporary fixing jig is at a position corresponding to a second side face which is at an opposite side of the first side face of the installation base.

13. The substrate processing apparatus according to claim 3, wherein the installation base is roughly a rectangular shape, the temporary fixing frame is at a position corresponding to a first corner of the installation base, and the temporary fixing jig is at a position corresponding to a second corner of the installation base which is diagonally opposite the first corner.

14. The substrate processing apparatus according to claim 4, wherein the installation base is roughly a rectangular shape, the temporary fixing frame is at a position corresponding to a first corner of the installation base, and the temporary fixing jig is at a position corresponding to a second corner of the installation base which is diagonally opposite the first corner.

15. The substrate processing apparatus according to claim 3, wherein the installation base is roughly a circular shape, and the temporary fixing frame and the temporary fixing jig are respectively at opposing positions in a radial direction of the installation base.

16. The substrate processing apparatus according to claim 4, wherein the installation base is roughly a circular shape, and the temporary fixing frame and the temporary fixing jig are respectively at opposing positions in a radial direction of the installation base.

17. The substrate processing apparatus according to claim 3, wherein the temporary fixing frame and the movable member hold the installation base therebetween, and the movable member moves in accordance with a deformation due to heat expansion of the installation base while pushing the installation base.

18. The substrate processing apparatus according to claim 4, wherein the temporary fixing frame and the movable member hold the installation base therebetween, and the movable member moves in accordance with a deformation due to heat expansion of the installation base while pushing the installation base.

19. A substrate processing apparatus for applying pressure on an object to be pressurized through an upper jig plate comprising a lower jig plate under the upper jig plate, an installation base on the lower jig plate, and a temporary fixing frame on the lower jig plate and contacting a part of an edge of the installation base, wherein the object is placed on the installation base, the installation base is temporarily fixed to the lower jig plate so the deformation of the installation base can be absorbed by the temporary fixing frame, the installation base comprises a base slanted portion at the edge of the installation base, and the temporary fixing frame comprises an inner slanted portion engaging the base slanted portion at an inner side of the temporary fixing frame where the edge of the installation base and the temporary fixing frame come into contact.

20. A substrate processing apparatus for applying pressure on an object to be pressurized through an upper jig plate comprising a lower jig plate under the upper jig plate, an installation base on the lower jig plate, and a temporary fixing frame on the lower jig plate and contacting a part of an edge of the installation base, wherein the object is placed on the installation base, the installation base is made of ceramics or glass, the installation base comprises a base slanted portion at the edge of the installation base, and the temporary fixing frame comprises an inner slanted portion engaging the base slanted portion at an inner side of the temporary fixing frame where the edge of the installation base and the temporary fixing frame come into contact.

21. A substrate processing apparatus for applying pressure on an object to be pressurized through an upper jig plate comprising a lower jig plate under the upper jig plate, an installation base on the lower jig plate, and a temporary fixing jig on the lower jig plate, wherein the object is placed on the installation base, the installation base is temporarily fixed to the lower jig plate so that deformation of the installation base can be absorbed by the temporary fixing jig, the temporary fixing jig comprises a movable member, the movable member is pushed towards the installation base from the temporary fixing jig due to a resilient force received from the temporary fixing jig, the movable member is pushed back towards the temporary fixing jig from the installation base due to a stress received from the installation base, the installation base is roughly a circular shape, and the temporary fixing frame and the temporary fixing jig are respectively at opposing positions in a radial direction of the installation base.

22. A substrate processing apparatus for applying pressure on an object to be pressurized through an upper jig plate comprising a lower jig plate under the upper jig plate, an installation base on the lower jig plate, and a temporary fixing jig on the lower jig plate, wherein the object is placed on the installation base, the installation base is made of ceramics or glass, the temporary fixing jig comprises a movable member, the movable member is pushed towards the installation base from the temporary fixing jig due to a resilient force received from the temporary fixing jig, the movable member is pushed back towards the temporary fixing jig from the installation base due to a stress received from the installation base, the installation base is roughly a circular shape, and the temporary fixing frame and the temporary fixing jig are respectively at opposing positions in a radial direction of the installation base.

* * * * *